United States Patent
Okujima et al.

(10) Patent No.: US 7,260,311 B2
(45) Date of Patent: Aug. 21, 2007

(54) APPARATUS, METHOD, PROGRAM AND RECORDING MEDIUM FOR PROGRAM RECORDING AND REPRODUCING

(75) Inventors: Kunihiro Okujima, Ehime-ken (JP); Hidenobu Beppu, Ehime-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1118 days.

(21) Appl. No.: 10/246,219

(22) Filed: Sep. 18, 2002

(65) Prior Publication Data

US 2003/0072556 A1 Apr. 17, 2003

(30) Foreign Application Priority Data

Sep. 21, 2001 (JP) ............................. 2001-289956

(51) Int. Cl.
*H04N 5/95* (2006.01)

(52) U.S. Cl. .......................................... 386/85; 386/46

(58) Field of Classification Search ................. 386/46, 386/68, 85; 360/7
See application file for complete search history.

(56) References Cited

U.S. PATENT DOCUMENTS

| | | | | |
|---|---|---|---|---|
| 4,739,418 A | * | 4/1988 | Iwahara et al. ............... 348/43 |
| 6,005,564 A | * | 12/1999 | Ahmad et al. ............... 715/723 |
| 6,370,688 B1 | * | 4/2002 | Hejna, Jr. .................... 725/101 |
| 2002/0026644 A1 | * | 2/2002 | Hatayama .................... 725/116 |

FOREIGN PATENT DOCUMENTS

| | | |
|---|---|---|
| JP | 07-250305 | 9/1995 |
| JP | 2000-022528 | 1/2000 |
| JP | 2000-324428 | 11/2000 |
| JP | 2000-350130 | 12/2000 |
| JP | 2001-052433 | 2/2001 |
| JP | 2001-094948 | 4/2001 |
| JP | 2001-111964 | 4/2001 |
| JP | 2001-119671 | 4/2001 |

* cited by examiner

*Primary Examiner*—Thai Q. Tran
*Assistant Examiner*—Girumsew Wendmagegn
(74) *Attorney, Agent, or Firm*—RatnerPrestia

(57) ABSTRACT

In recording and reproducing a program contents, a first difference between a desired playback start time and a time corresponding to a desired recorded video position of said program is calculated, then a second difference between the desired start time of the program and a desired end time of the program is calculated. Then, based on the first and the second differences, a plurality of predetermined speeds are used sequentially to playback the recorded program.

18 Claims, 18 Drawing Sheets

APPARATUS, METHOD, PROGRAM AND RECORDING MEDIUM FOR PROGRAM RECORDING AND REPRODUCING

FIELD OF THE INVENTION

The present invention relates to an apparatus, method, program and recording medium for recording and reproducing a program, corresponding to time shifting playback.

BACKGROUND OF THE INVENTION

In a personal video recorder equipped with a randomly accessible memory device such as a hard disk drive, a product with time-shift function that enables to reproduce a certain time delayed video position in already recorded portion of a broadcast program while the program recording is still in progress, has been produced.

With time-shift function, a viewer can reproduce a desired recorded scene repeatedly using functions including pause, fast-forward, or fast-reverse etc. at a desired recorded position. That is, because the time-shift function enables a repeat of crucial scenes and to go back to missed scenes, this is useful in grasping the program contents.

As for time-shift function, Japanese Patents publication numbers 2001-111964, 2000-350130, and H07-250305 are well known.

FIG. 17 shows system structure of a recording and reproducing apparatus that have conventional time-shift function.

In the conventional recording and reproducing apparatus, recording mechanism 1702 outputs audio/video signals of broadcast program etc. to randomly accessible memory means 1701 and reproducing mechanism 1704 outputs audio/video signals stored in the memory means 1701. Recording means 1703 controls a recording action and input/output of audio/video signals for recording by the recording mechanism 1702. Reproducing means 1705 controls reproduction action and input/output of audio/video signals for reproducing by the reproducing mechanism 1704. Time-shift means 1707 performs time shifting playback by controlling the recording means 1703 and the reproducing means 1705 at the same time while recording of the program is still in progress. When total control means 1709 receives operation command from operation input means 1708, the total control means 1709 directs the time-shift means 1707 to control the recording means 1703 and the reproducing means 1705. Then the time-shift means 1707 executes time shifting playback by controlling the recording means 1703 and the reproducing means 1705.

When time shift operation is performed in the recording and reproducing apparatus of prior art, time difference between time position in recording signal and time position in reproducing signal occurs. (This difference is called hereinafter "time difference".) This time difference exists as long as playback is done with normal playback speed. Therefore, playback end of a program does not occur until a period of time equal to the time difference elapses after the broadcast end of the program. FIG. 18 shows a diagram of the delay of the playback end of the program.

Further, there was a recording and reproducing method that fast-forward playback is performed corresponding to the time difference so that time-shifting playback of a program ends at the same time as the recording of the program ends.

When a desired program is to be broadcasted in other channel just after the end of broadcast program or when viewer has to go out just after the end of the viewing program, it was necessary to complete a viewing of the program by the broadcast program end using fast forward function intentionally to resolve the time difference. In that case, however, sometimes understanding of the program was difficult because of too fast playback speed.

Considering above issue in conventional apparatus, this invention aims to provide an apparatus, method, program and record medium that enables time shifting playback of a program to end by the broadcast program end.

SUMMARY OF THE INVENTION

In recording and reproducing a program in a program recording and reproducing apparatus having time shifting playback function, a first difference between an actual start time of time-shifting in the program and a desired start time of the program, then a second difference between the desired start time of the program and a desired end time of the program are calculated. Based on the first and the second differences, special playback speed for reproducing the program is calculated to end playback of the program at the desired end time using one of a plurality of predetermined speeds sequentially. The present invention achieves to finish playback of a program by the broadcast program end time using special playback speed corresponding to time difference making the program contents to be easily understandable.

DETAILED DESCRIPTION OF THE INVENTION

Figure 1:
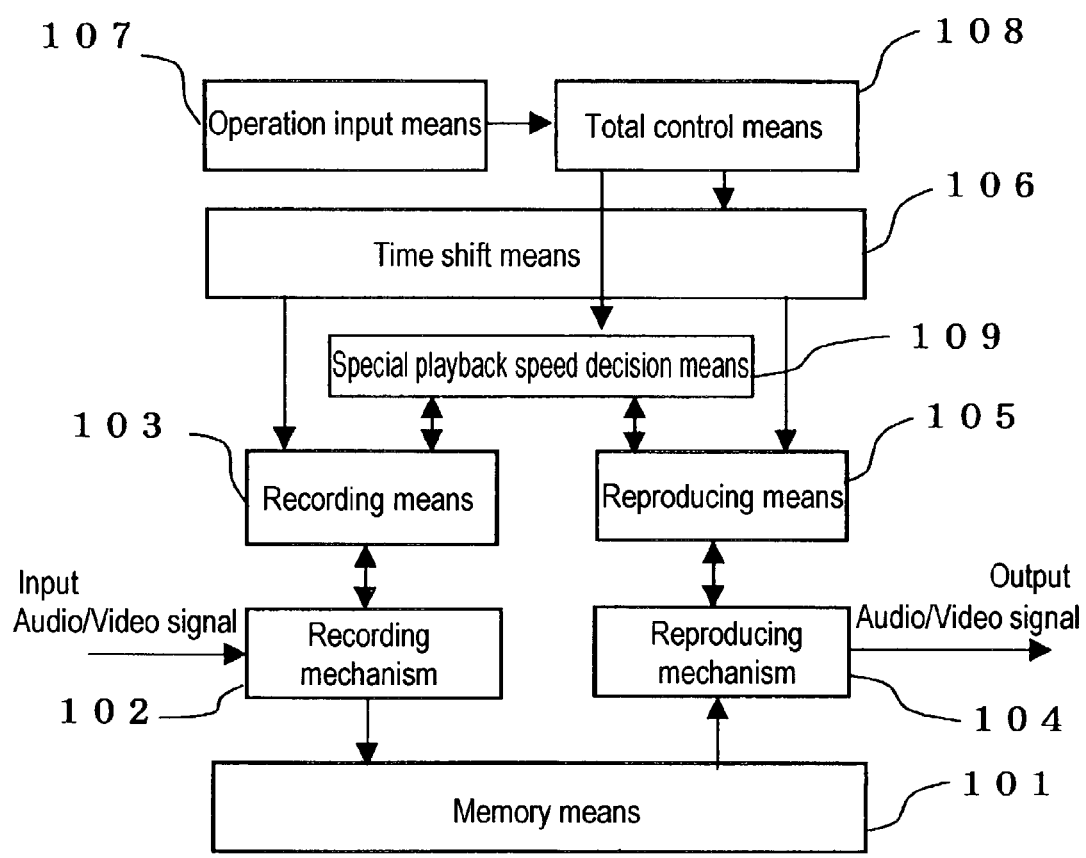
FIG. 1 is a block diagram showing system construction of a program recording and reproducing apparatus according to an embodiment of the invention.

Preferred embodiments of this invention will be described in detail referring to the drawings.

First Embodiment

First, structure of a recording and reproducing apparatus of the first embodiment of the present invention is explained referring to FIG. 1, which shows system structure of the invention.

In a recording and reproducing apparatus of the present invention, recording mechanism 102 outputs audio/video signal of a broadcast program to a randomly accessible memory means 101. Reproducing mechanism 104 outputs the audio/video signal recorded in the memory means 101. Recording means 103 controls input/output of audio/video signal and recording action for recording by the recording mechanism 102. Reproducing means 105 controls input/output of audio/video signal and reproduction action for playback by the reproducing mechanism 104. Time-shift means 106 executes time-shifting playback of a program while the program is still being recorded by controlling the recording means 103 and the reproducing means 105 simultaneously. Operation input means 107 inputs operation command to total control means 108. When time-shifting playback is commanded from operation input means 107 to the total control means 108, the total control means 108 gives movement instruction to the time-shift means 106, then the time-shift means 106 controls the recording means 103 and the reproducing means 105 to execute time-shifting playback.

Next, action of the recording and reproducing apparatus in the exemplary embodiment of the present invention is described, referring to FIGS. 1 through 5.

When time shifting playback is executed, time difference between a time position in a playback video signal being reproduced by reproducing mechanism 104, and a time position in the video signal being recorded by the recording mechanism 102 occurs. When special playback command is sent from the operation input means 107 to the total control means 108, the total control means 108 gives movement instruction to the special playback speed decision means 109. The special playback command is a command for reproducing a program with such a special playback speed that automatically resolve the time difference by the broadcast program end.

When the decision means 109 receives the instruction for the special playback command, the decision means 109 acquires time information of the playback video being reproduced by the reproducing mechanism 104 from the reproducing means 105, and time information of the recording video being recorded by the recording mechanism 102 from the recording means 103. Then, the decision means 109 determines if there is any time difference between the acquired playback time information and the recording time information, and calculates the time difference (t1). In addition, remaining broadcast program time (t2) that is left until the broadcast program end is calculated from the recording time information acquired from the recording means 103 and broadcast program end time information of the program being viewed, which the recording mechanism 102 acquired from EPG (Electronic Program Guide). Then the special playback speed value is calculated by (t1+t2)/t2.

Based on the calculated special playback speed value, the decision means 109 gives a command for controlling playback speed to the reproducing means 105.

Figure 2:
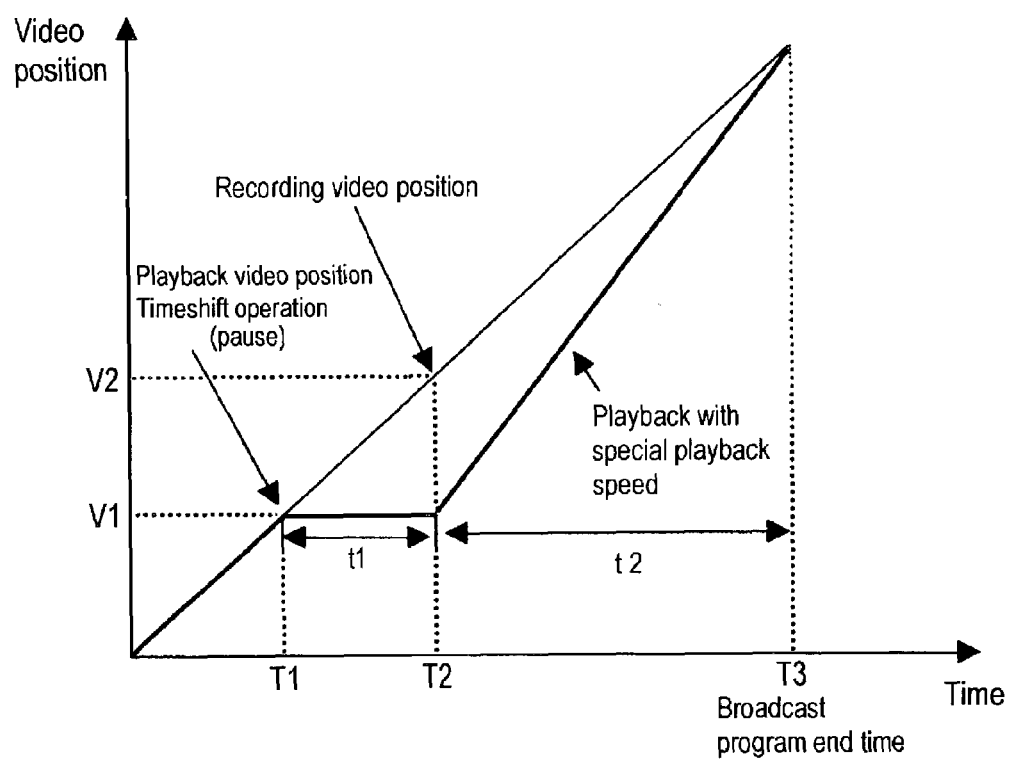
FIG. 2 is a diagram showing relation between video position and time.

FIG. 2 shows relation between the above mentioned time difference (t1) and the remaining broadcast program time (t2) left to the broadcasting program end time.

In FIG. 2, horizontal axis indicates time, and vertical axis indicates position of recording video and reproducing video. Start time and end time of a broadcast program including program extension information can be acquired from EPG Recording position V2 and time information T2 are acquired from the recording means 103. Playback video position V1 and playback time information T1 are acquired from the reproducing means 105. Broadcast time of each program can be acquired from EPG or other means including program information such as barcode information indicating broadcast program. Current time may be acquired from built-in clock in the recording and reproducing apparatus, audio/video data and internal clock in the recording means 103 or the reproducing means 105, in addition to EPG.

Here, relation between video position and time corresponding to the video position are explained. Time T2 is a desired playback start time of a program, which is time information of the recording video when a viewer desires to start a time shift playback. Video position V1 is a desired program video position, which the viewer desires to watch. Time T3 is an end time of the program. Time T3 can be a desired end time of the program, which is an end time of time shifting playback selected by the viewer.

When time shifting playback starts from the desired playback start time T2 and the desired program video position V1, time difference between time T1 that is corresponding to the desired video position V1 and the desired start time T2 is regarded as the time difference (t1). Playback of the playback video need to be performed with a special playback speed that is faster than normal playback in order to end the playback action by the program end time T3, while the playback delays for the time difference (t1) when the playback of the playback video is performed with the normal playback speed. Then, corresponding to the time difference t1, special playback speed is controlled and used.

The special playback speed include two playback speed groups, the first special playback speed group enabling audio contents to be understood and the second special playback speed group, which is faster than the first special playback speed, enabling playback scene to be understood from only video without audio, and these speeds are used sequentially. Hereinafter, the two playback speed groups are called the first special playback speed and the second special playback speed respectively.

Figure 5:
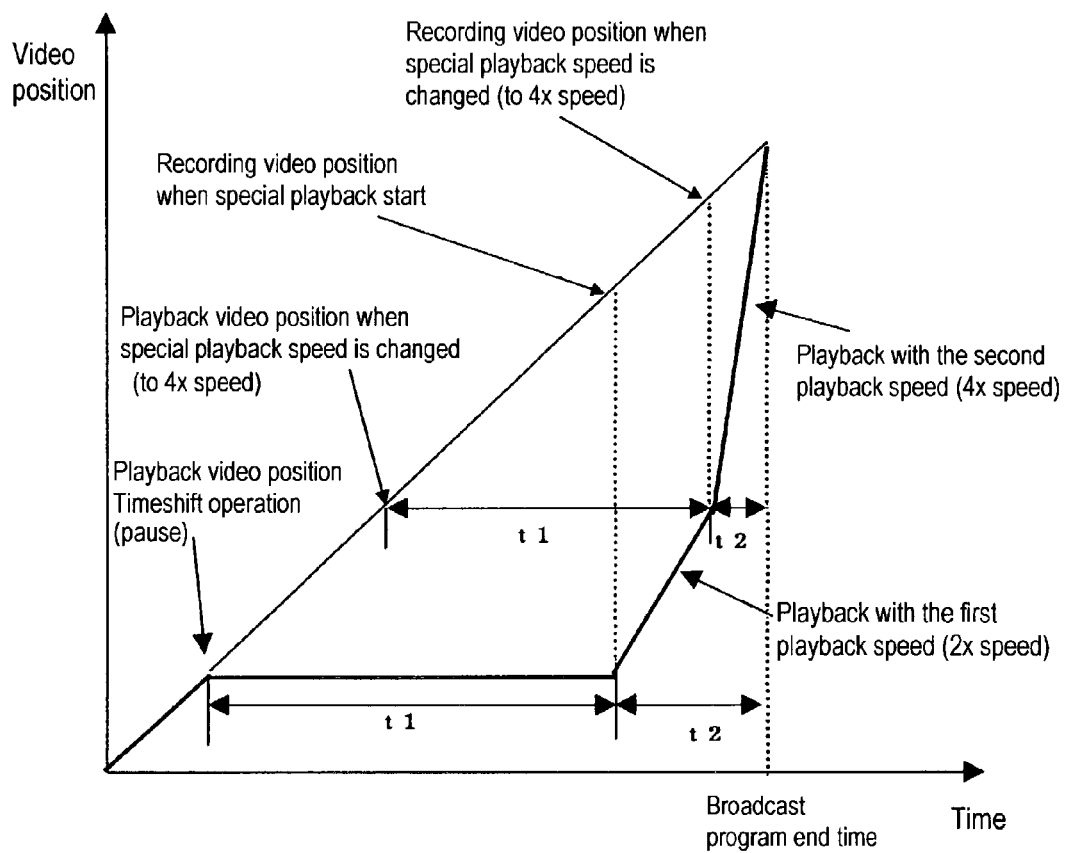
FIG. 5 is a diagram showing relation between video position and time in the first embodiment of the present invention.
Figure 8:
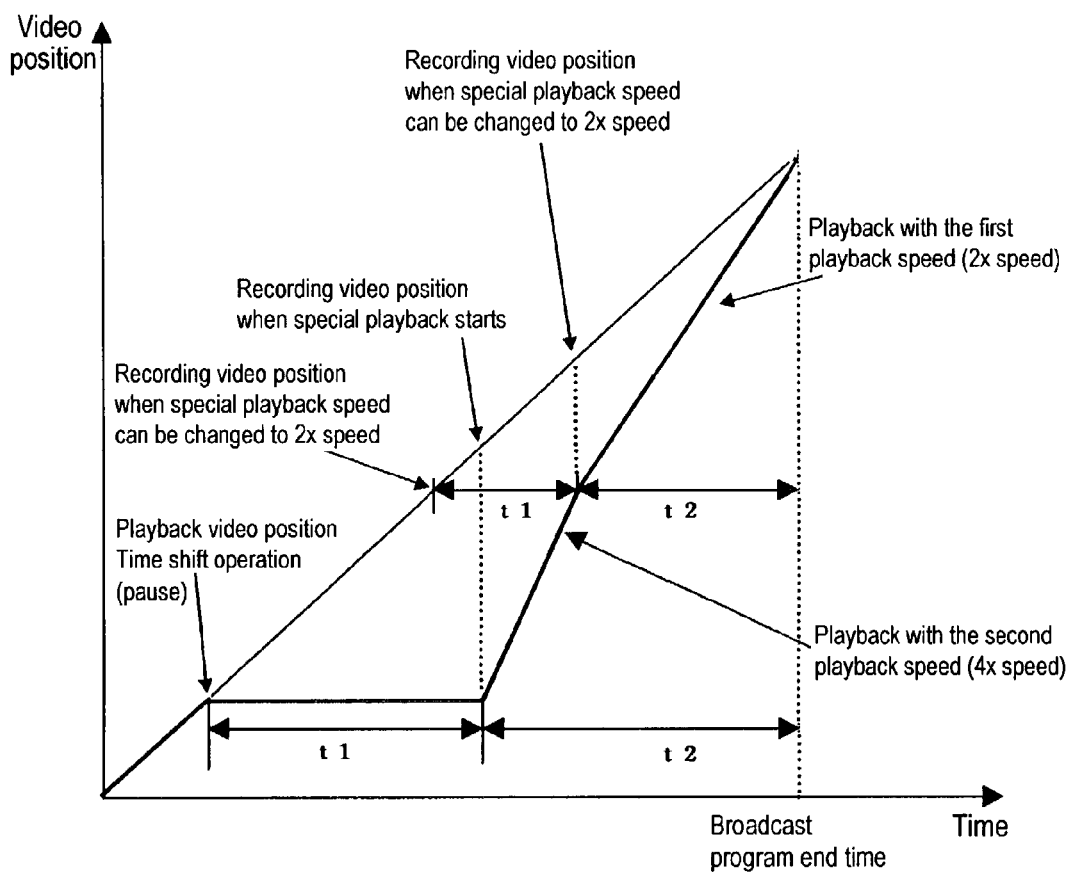
FIG. 8 is a diagram showing relation between video position and time in the second embodiment.

In case if it seems impossible to catch up with the broadcast program using only the first special playback speed, the second special playback speed is used. An example using this 2-step playback speed is shown in FIG. 5. FIG. 8 shows an example that, time difference is calculated and a timing to change the playback speed to the first playback speed is detected during playback with the second special playback speed, and then the first playback speed is used. Of course, other playback speeds, at which audio contents of the playback video are understood, can be sequentially selected by depending on time difference.

In this embodiment, the first special playback speed is a playback speed faster than normal speed (1× speed) and slower than 2× speed or 2× speed, and the second special playback speed is a high-speed playback faster than 2× speed and slower than 4× speed, or equal to 4× speed. The 2× speed is double speed, which is twice as fast as the normal speed. However, maximum speed of the first special playback speed can be other than 2× speed if the speed is in the range that its playback audio and video contents can be understood. Similarly, maximum speed of the second special playback speed can be other than 4× speed if the speed is in the range that its playback video can be understood, but no audio is available.

Time difference is caused when playback action is paused while viewing in real-time, and then the playback action is restarted again, or when recording of a program is started and then the playback action is started late after a certain period passed. Time difference is also caused when video position is returned from a certain position to a desired portion, then playback starts from the desired position and so on.

In the following embodiments, 1.5× and 2× speed are used as the first special playback speed enabling audio contents to be understood, and 4× speed is used as the second special playback speed enabling playback scene to be understood from only video without audio to simplify this description.

Hereinafter movement of special playback speed decision means 109 in the first embodiment of the present invention is described referring to FIG. 3.

First, special playback speed decision task in the decision means 109 starts (step 301), then pauses until the special playback speed decision means 109 receives special playback command transmitted by the total control means 108 (step 302). When the decision means 109 receives the special playback command, the special playback speed decision task is activated, then the decision task determines whether special playback is in process or not (step 303). When special playback is not in process, time information T1 of playback video that is being reproduced by the reproducing mechanism 104 is acquired from the reproducing means 105, and time information T2 of recording video that is being recorded by the recording mechanism 102 is acquired from the recording means 103. Then time difference (t1) is calculated by T2−T1 (step 304).

When there is any time difference (step 305), broadcast program end time T3 is acquired from EPG information, then remaining broadcast program time (t2) is calculated by T3−T2. With the calculated remaining broadcast program time (t2), special playback speed value is calculated by (t1+t2)/t2 (step 306).

In the first embodiment, the second playback speed that viewer can understand contents of a broadcasting program only from video without audio is set to 4× speed, and the calculated special playback speed value is determined whether it is 4 or less (step 307).

When the calculated special playback speed is 4 or less; in the first embodiment, upper limit of the first playback speed is set to 2× speed and the special playback speed value is determined whether it is 2 or less at step 308. If it is 2 or less, then the special playback speed is determined whether it is 1.5 or less at step 309.

In the first embodiment, the first playback speed is explained using 1.5× speed and 2× speed.

When the calculated special playback speed value is 1.5 or less; the special playback speed decision means 109 determines the final special playback speed to 1.5× speed (step 310). Then 1.5× speed playback is directed to the reproducing means 105 and the process step returns to the step 302.

When the calculated special playback speed value is more than 1.5; the speed decision means 109 determines the final special playback speed to 2× speed (step 311). Then 2× speed playback is directed to the reproducing means 105 and the process returns to the step 302.

When the calculated special playback speed is faster than 2× speed at the decision process step 308, the speed decision means 109 decides the final special playback speed to 2×, which is the highest speed within the corresponding first playback speed of the reproducing mechanism 104 (step 312), and directs the reproducing means 105 to process 2× speed playback. Besides, monitor task is activated (step 313), and process returns to step 302.

When the calculated special playback speed value is more than 4; in this case, special playback command is not accepted and the process returns to the step 302. In the first embodiment, it is aimed to eliminate the time difference by the broadcast program end time using a playback speed enabling program contents to be understood. If playback speed is faster than 4× speed, it will be difficult to understand the program contents even if time difference is resolved. In order to prevent viewer from having a difficulty of understanding scenes the command indicates that the playback speed is faster than 4× speed is not accepted. Messages, which show that the command is not accepted, can be displayed on video output screen and so on.

Monitor task of the process step 313 included in the special playback speed decision means 109 monitors timing for automatically switching the playback speed. The first special playback speed changes to the second special playback speed in case that it becomes impossible to end the playback of a program by the end of broadcast program, if playback with the first special playback speed decided in the step 312 is kept.

Figure 4:
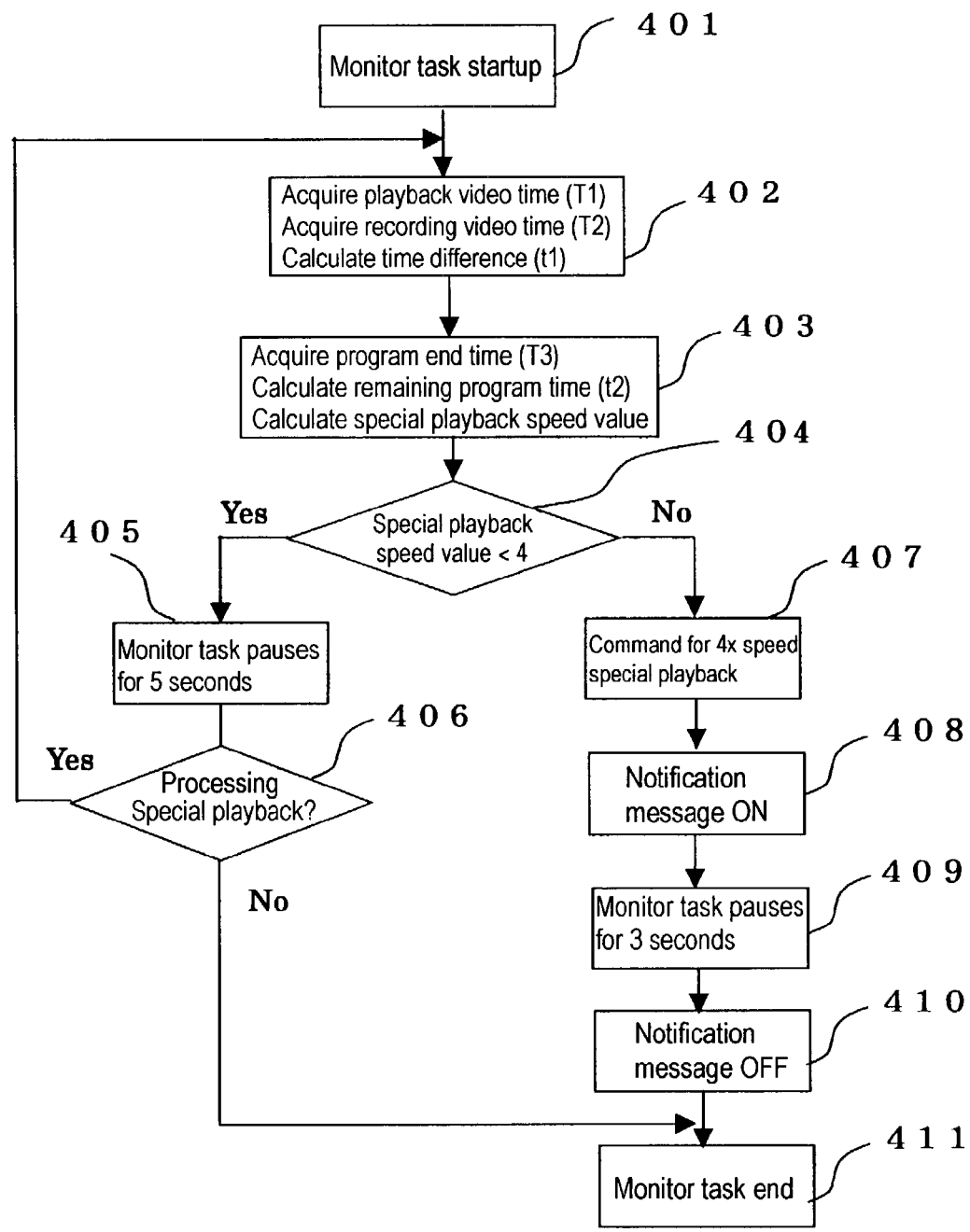
FIG. 4 is a flowchart for describing special playback speed decision steps in monitor task of a time-shift recording and reproducing method in the first embodiment of the invention.

Hereinafter the action of the monitor task is described with reference to the flowchart shown in the FIG. 4. The monitor task starts first (step 401). Next, time information T1 of the playback video that is being reproduced by the reproducing mechanism 104 and time information T2 of the recording video that is being recorded by the recording mechanism 102 are acquired to calculate time difference (t1) by T2−T1 (step 402). Broadcast program end time T3 is acquired from EPG information. The remaining broadcast program time (t2) is calculated by T3−T2 (step 403), then special playback speed value is calculated by (t1+t2)/t2. In this embodiment, this calculated special playback speed value is determined whether it is less than 4 within the second special playback speed.

When the special playback speed value is less than 4; the monitor task pauses for 5 seconds (step 405), then determines whether special playback process is still continued after 5 second (step 406). When special playback process is continued, process returns to the step 402. If special playback process has already completed, the monitor task ends based on command from the operation input means 107 (step 411).

When the special playback speed value is 4 or more; the special playback speed decision means 109 commands the reproducing means 105 to perform playback process with 4× speed (step 407). In this embodiment, a message for notifying a viewer that special playback speed is automatically changed from 2× speed to 4× speed will be displayed on video output screen.

After that, monitor task pauses for 3 seconds (step 409), and remove the message displayed at the process step 408 (step 410). Then the monitor task ends.

Figure 6:
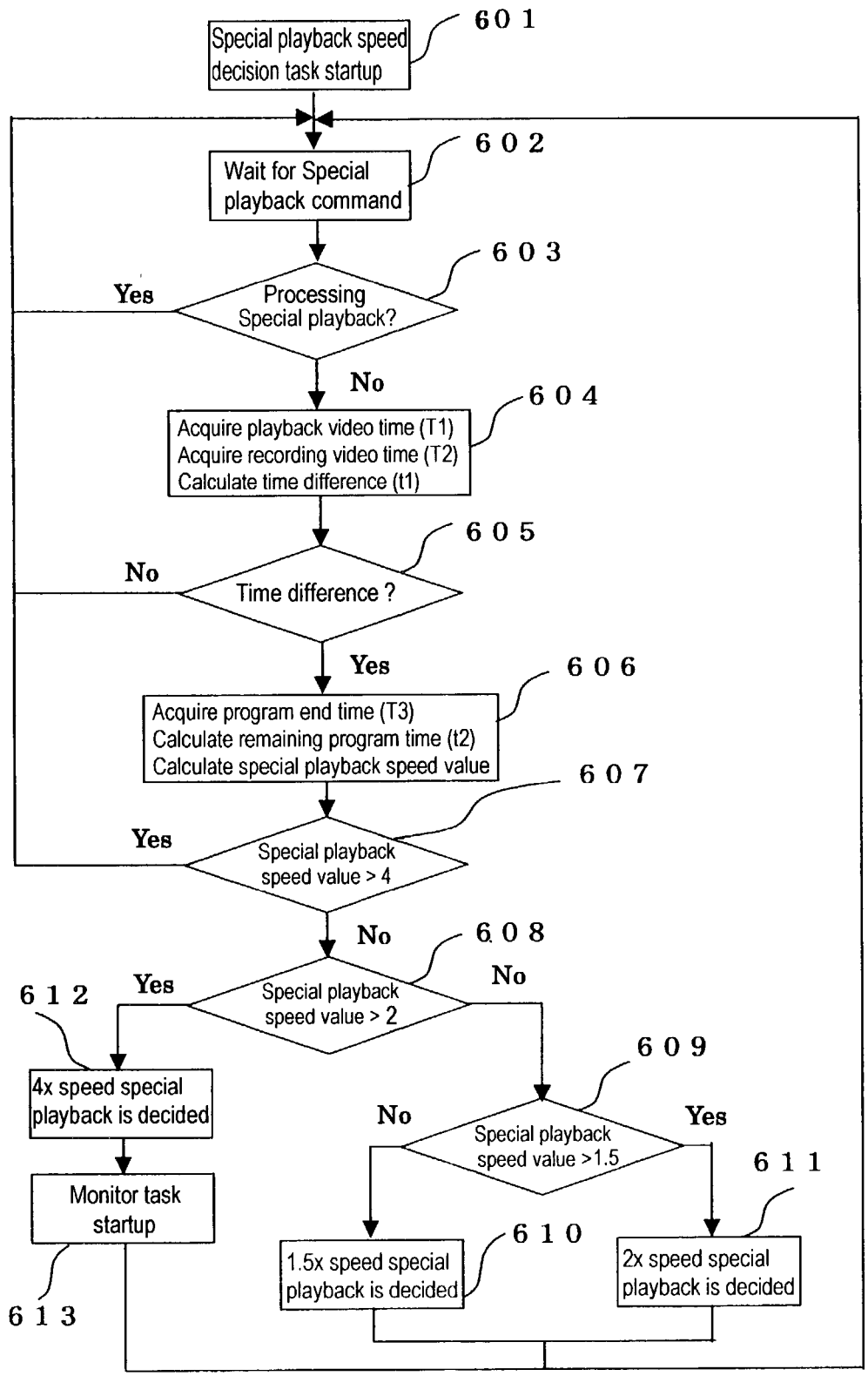
FIG. 6 is a flowchart for describing special playback speed decision steps in monitor task of a time-shift recording and reproducing method of the second embodiment of the invention.
Figure 7:
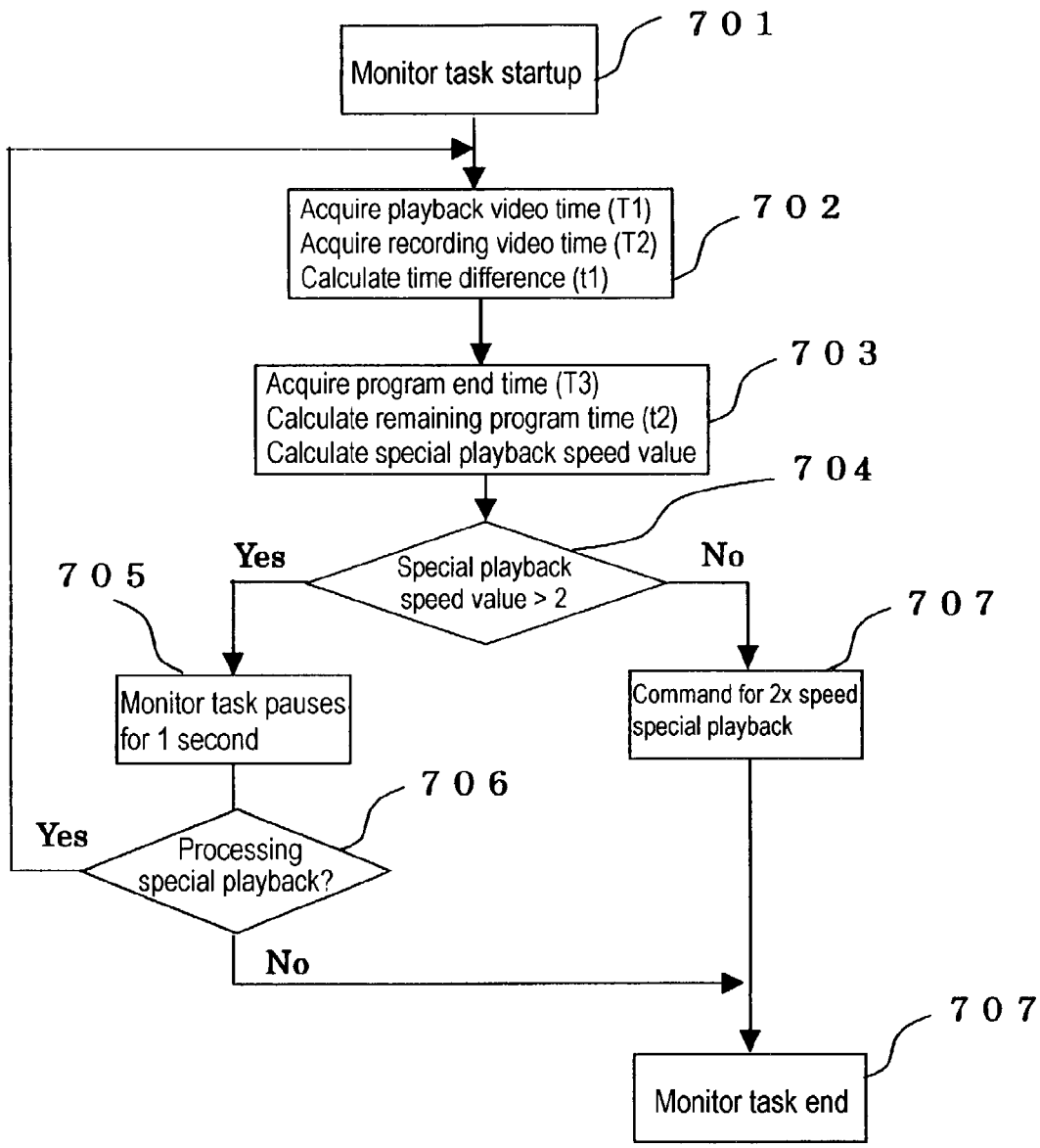
FIG. 7 is a flowchart for describing special playback speed decision steps in monitor task of a time-shift recording and reproducing method of the second embodiment of the invention.

FIG. 5 is a diagram showing relation between position of record/playback video and time when special playback process shown in FIGS. 6 and 7 is performed by the decision means 109 according to the first embodiment of the present invention.

In the first embodiment, viewer can end playback of a program with grasping the program contents, automatically resolving time difference occurred by time-shift operation by the time the broadcast program ends without handling troublesome playback command operations.

In this embodiment, the second playback speed enabling playback scene to be understood only from video without audio is set 4× speed, but other setting for the second speed may be applicable.

Figure 3:
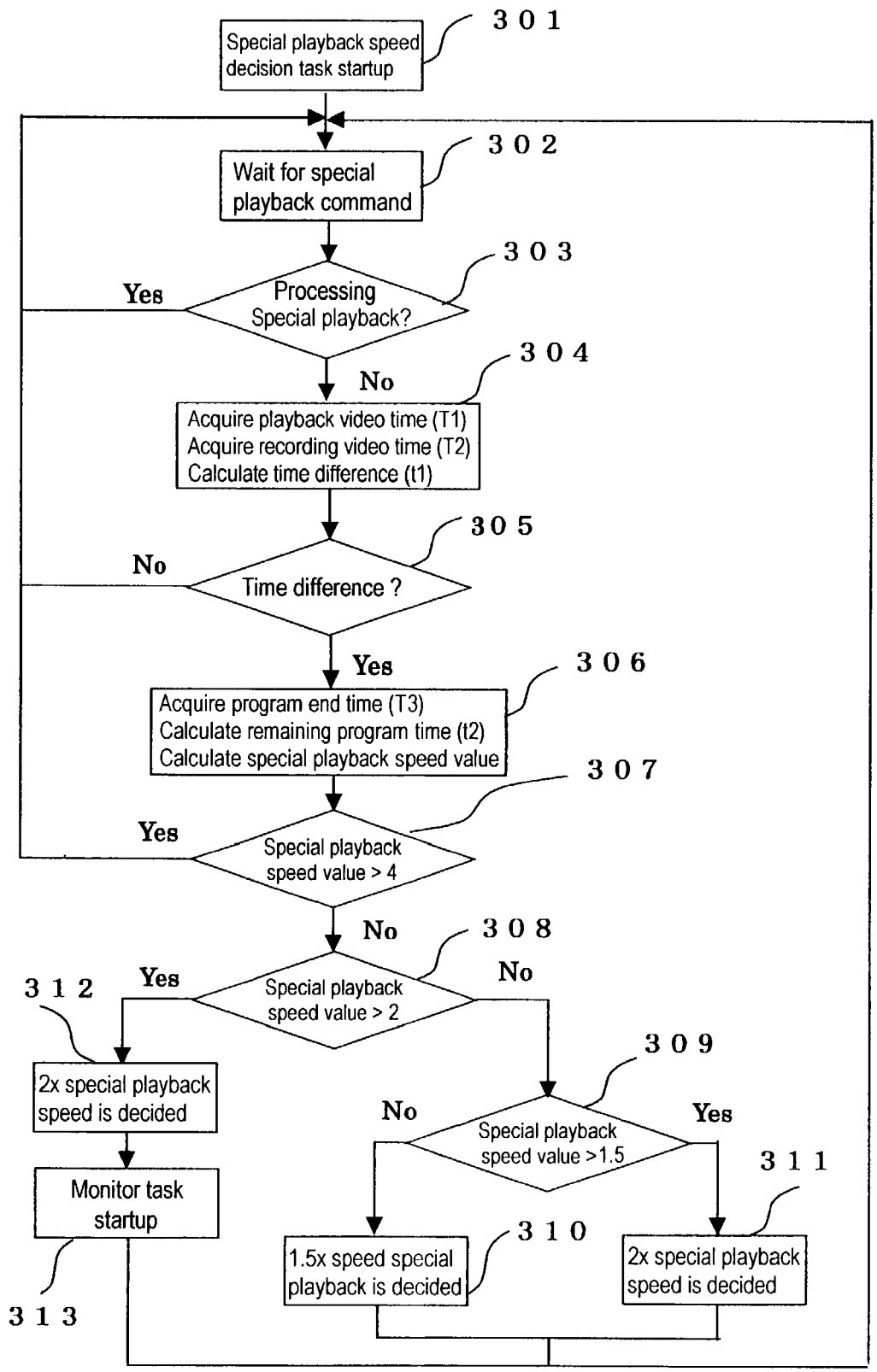
FIG. 3 is a flowchart for describing special playback speed decision steps of a time-shift recording and reproducing method in the first embodiment of the invention.

In addition, at the process step 308 shown in FIG. 3, the first playback speed enabling audio content to be understood is set 2× speed, but other setting for the first speed is applicable. Furthermore, in the step 405 shown in FIG. 4, monitor period of monitor task is set to 5 seconds, but other setting is possible. The message display period is set for 3 seconds in the process step 409 in shown FIG. 4, but other setting is applicable.

The Second Embodiment

Next, referring to FIGS. 1, 6, 7 and 8, structure and action of a recording and reproducing apparatus of the second embodiment are described.

In the second embodiment, the apparatus has similar structure and action to that in the first embodiment, but action of the special playback speed decision means 109 is different.

Here, action of the speed decision means 109 in the second embodiment is described referring to the FIG. 6.

Firstly, special playback speed decision task of the special playback speed decision means 109 starts (step 601), and pauses until the decision means 109 receives special playback command transmitted from the total control means 108 (step 602). When the decision means 109 receives the special playback command, the special playback speed decision task is activated and it is determined whether special playback is already in process (step 603). If special playback is not in process, the speed decision means 109 acquires time information T1 of playback video that is being reproduced by the reproducing mechanism 104 from the reproducing means 105, and time information T2 of recording video that is being recorded by the recording mechanism 102 from the recording means 103. Then, time difference t1 is calculated by T2−T1 (step 604).

When there is any time difference (step 605), the decision means 109 acquires broadcast program end time T3 from EPG information, and calculates remaining broadcast program time t2 by T3−T2 to calculate special playback speed value by (t1+t2)/t2 (step 606). In the second embodiment, the second playback speed enabling playback scene to be understood only from video without audio is set to 4× speed as in the first embodiment. Therefore, the speed decision means 109 determines whether the special playback value is 4 or less (step 607).

When the calculated special playback speed value is 4 or less; in the second embodiment, the upper limit of the first playback speed that enabling audio content of playback scene to be understood is set 2× speed and the decision means 109 determines whether the special playback speed value is 2 or less (step 608). As a result, if the value is 2 or less, the value is determined whether it is 1.5 or less again (step 609).

In the second embodiment, the first special playback speed is corresponding to 1.5× speed and 2× speed.

When the calculated special playback speed value is 1.5 or less; the final special playback speed is decided to 1.5× speed (step 610), then playback process with 1.5× speed is commanded to the reproducing means 105 and process returns to the step 602.

When the calculated special playback speed value is more than 1.5; the final special playback speed is decided to 2× speed (step 611). 2× speed special playback is commanded to the reproducing means 105 and process returns to process step 602.

When the calculated special playback speed is faster than 2× speed in process step 608; in this second embodiment, the second playback speed enabling playback scene with only video without audio to be understood is set to 4× speed (step 612), and 4× speed playback is commanded to the reproducing means 105. Also, monitor task startup, (step 613) and process returns to the process step 602.

When the special playback value is more than 4; actions of and after step 607 are the same as that of in the first embodiment.

Monitor task of the process step 613 is included in the special playback speed decision means 109 and monitors timing to change the second playback speed (4× speed in the second embodiment) to the first playback speed (2× speed in the second embodiment) during playback with the second playback speed decided in the process step 612 is kept.

Hereinafter the performance of the monitor task is described referring to flowchart in FIG. 7. The monitor task starts first (step 701). Then time information T1 of the playback video that is being reproduced by the reproducing mechanism 104 and time information T2 of the recording video that is being recorded by the recording mechanism 102 are acquired to calculate time difference t1 by T2−T1 (step 702). Broadcast program end time T3 is acquired from EPG information. Then the remaining broadcast program time t2 is calculated by T3−T2 (step 703), and special playback speed value is calculated by (t1+t2)/t2. In this second embodiment, the upper limit of the first playback speed which enabling audio content to be understood is set to 2× speed, and the calculated special playback speed is determined whether it is 2× or less.

When the special playback speed value is more than 2; monitor task pauses for 1 second (step 705), and the special playback speed decision means 109 determines whether special playback is still in process after 1 second (step 706). When special playback process is still in process, process returns to the step 702. When special playback process has already completed based on a command from the operation input means 107, this monitor task ends (step 708).

In case when the special playback speed value is 2 or less; the reproducing means 105 is commanded to perform 2× speed playback (step 707), then monitor task ends (step 708).

FIG. 8 is a diagram showing relations between position of record/playback video and time when special playback process shown in FIGS. 6 and 7 are performed.

As described above, in the second embodiment of the present invention, viewer can end playback of a program with grasping the program contents, automatically resolving time difference occurred by time-shift operation by the time the broadcast program ends without troublesome playback command operation.

In the second embodiment, in the process step 607 in FIG. 6, the second playback speed that enabling playback scene contents to be understood without audio is set to 4× speed, but other setting may be applicable. In the process step 608 shown in FIG. 6, upper limit of the first playback speed that enabling playback audio contents to be understood is set to 2× speed, but other setting may be applicable. In addition, in the process step 705, monitor period of the monitor task is set 1 second, but other setting may be applicable.

The Third Embodiment

Structure and action of a recording and reproducing apparatus of the present invention is described, referring to FIGS. 1, 9, 10 and 11.

Recording and reproducing apparatus of this embodiment is similar to the recording and reproducing apparatus of the first embodiment in structure and action, but action of the special playback speed decision means 109 is different.

Figure 9:
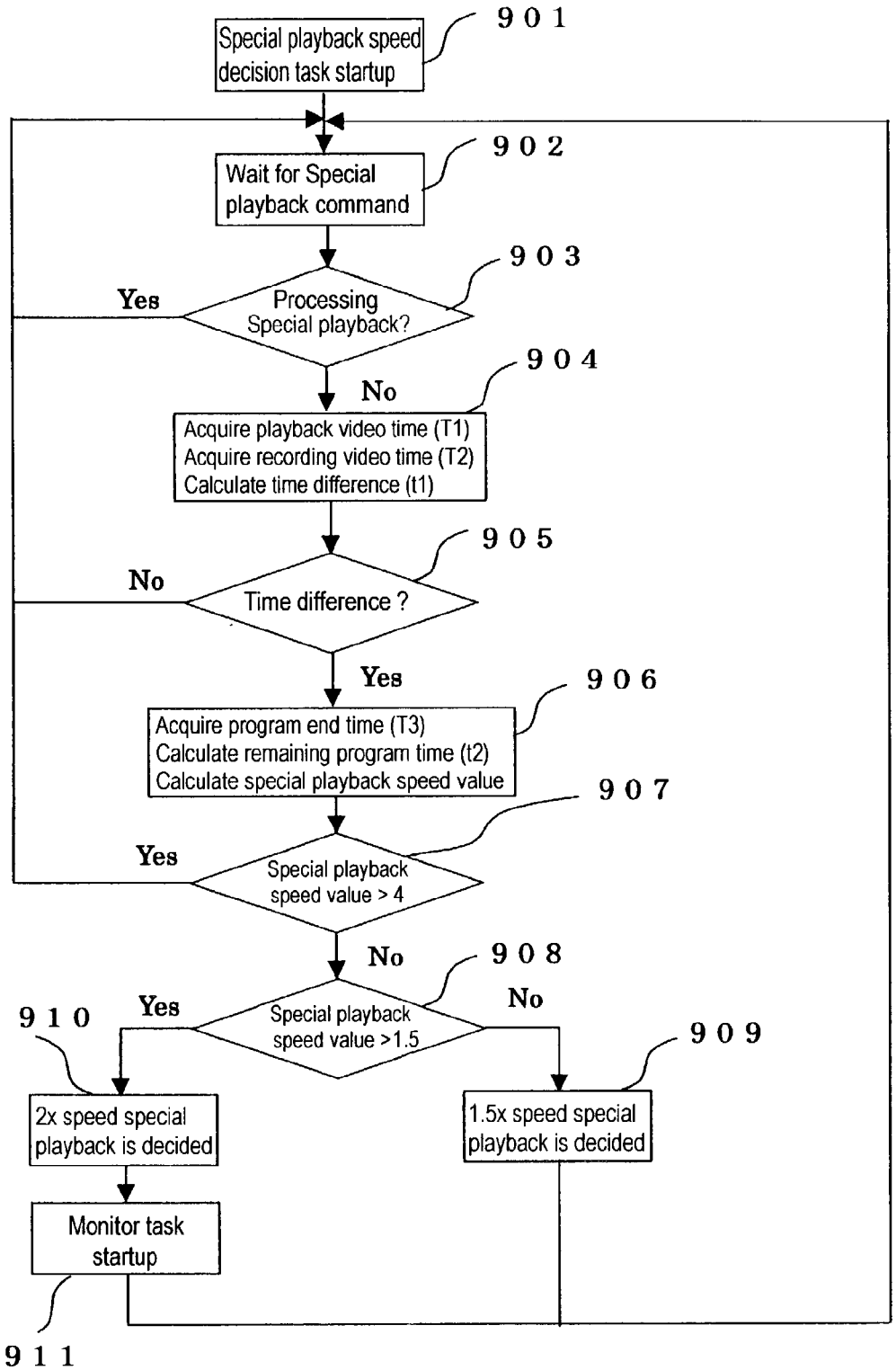
FIG. 9 is a flowchart for describing special playback speed decision steps of a time-shift recording and reproducing method of the third embodiment of the invention.

Here, action of special playback speed decision means in the third embodiment of the present invention is described referring to flowchart shown in FIG. 9.

Firstly, special playback speed decision task of the special playback speed decision means 109 starts up (step 901), and pauses until the decision means 109 receives special playback command from the total control means 108 (step 902). When the speed decision means 109 receives the special playback command, special playback speed decision task is activated and it is determined whether special playback is already in process (step 903). If special playback is not in process, the decision means 109 acquires time information T1 of playback video that is being reproduced by reproducing mechanism 104 from reproducing means 105, and time information T2 of recording video that being recorded by recording mechanism 102 from recording means 103. Then, time difference t1 is calculated by T2−T1 (step 904).

When time difference exists (step 905), broadcast program end time T3 is acquired from EPG information, and remaining broadcast program time t2 is calculated by T3−T2. Then special playback speed value is calculated by (t1+t2)/t2 (step 906). In the third embodiment, the second playback speed that contents of playback scene to be understood from only video without audio is set to 4× speed, as in the first embodiment. The calculated special playback speed is determined whether 4 or less (step 907).

When special playback speed value is 4 or less; in the third embodiment, 2× speed and 1.5× speed are supported as the first playback speed that enabling playback audio contents to be understood and the decision means 109 determines whether it is 1.5 or less (step 908).

When the calculated special playback speed value is 1.5 or less; the decision means 109 decides to set the final special playback speed to be 1.5× speed, and commands the reproducing means 105 to perform 1.5× speed playback, then process returns to the step 902.

When the calculated special playback speed value is more than 1.5; playback with 2× speed is commanded to the reproducing means 105 to perform 2× speed playback. In addition, monitor task is started (step 911), and process returns to the process step 902.

When the calculated special playback speed value is more than 4; action of step 907 that returns to step 902 is the same as that of in the first embodiment.

Monitor task of the process step 911 included in the special playback speed decision means 109, monitors timing for automatically changing the first playback speed to the second playback speed in order to resolve the time difference by the time broadcast program ends. Also the monitor task monitors to detect extension of broadcast program end time from EPG information to keep the playback with the first playback speed as long as possible, and if possible automatically changes the first special playback speed to the lower one.

Hereinafter the performance of the monitor task is described referring to flowchart in FIG. 10. The monitor task starts (step 1001) first. Then time information T1 of the playback video, which is being reproduced by the reproducing mechanism 104 and time information T2 of the recording video, which is being recorded with the recording mechanism 102, are acquired to calculate time difference t1 by T2−T1 (step 1002). Broadcast program end time T3 is acquired from EPG information. Then the remaining broadcast program time t2 is calculated by T3−T2 (step 1003) and special playback speed value is calculated by (t1+t2)/t2. In the third embodiment, the second playback speed enabling playback scene to be understood only from video without audio is set to 4× speed, as in the first embodiment. This calculated special playback speed value is determined whether it is less than 4 (step 1004).

When the special playback speed value is less than 4; special playback speed value is determined whether it is 1.5 or less further (step 1005).

When the calculated special playback speed value is 1.5 or less; according to the extended broadcast program end time, the remaining broadcast program time t2 in process step 1003 is extended. Therefore special playback speed value calculated by (t1+t2)/t2 becomes smaller. As a result, time difference is eliminated by the time the broadcast program ends even if special playback speed is lowered, that is, even if special playback speed is changed from 2× speed to 1.5× speed.

In this case, playback with 1.5× speed is commanded to the reproducing means 105 (step 1008), and the monitor task ends (step 1013).

When the special playback speed value is more than 1.5; monitor task pauses for 5 seconds (step 1006), and determines whether the special playback process is in continue or not after 5 seconds (step 1007). When it is still in special playback process, process returns to the step 1002. If the special playback process is already ended by command from operation input means 107, this monitor task ends (step 1013).

Detection of broadcast program end time extension increases situation that 2× speed playback of the first special playback speed can be kept even in cases such that special playback speed would have to be changed to 4× speed but for broadcast program end time extension.

When the special playback speed value is more than 4; 4× speed playback is commanded to the reproducing means 105 (step 1009), and in this third embodiment, message for notifying viewer that special playback is changed from 2× speed to 4× speed is automatically displayed on video output screen (step 1010).

After that, the monitor task pauses for 3 seconds (step 1011). Then the message that is displayed in the step 1010 is removed (step 1012), and the monitor task ends.

Figure 10:
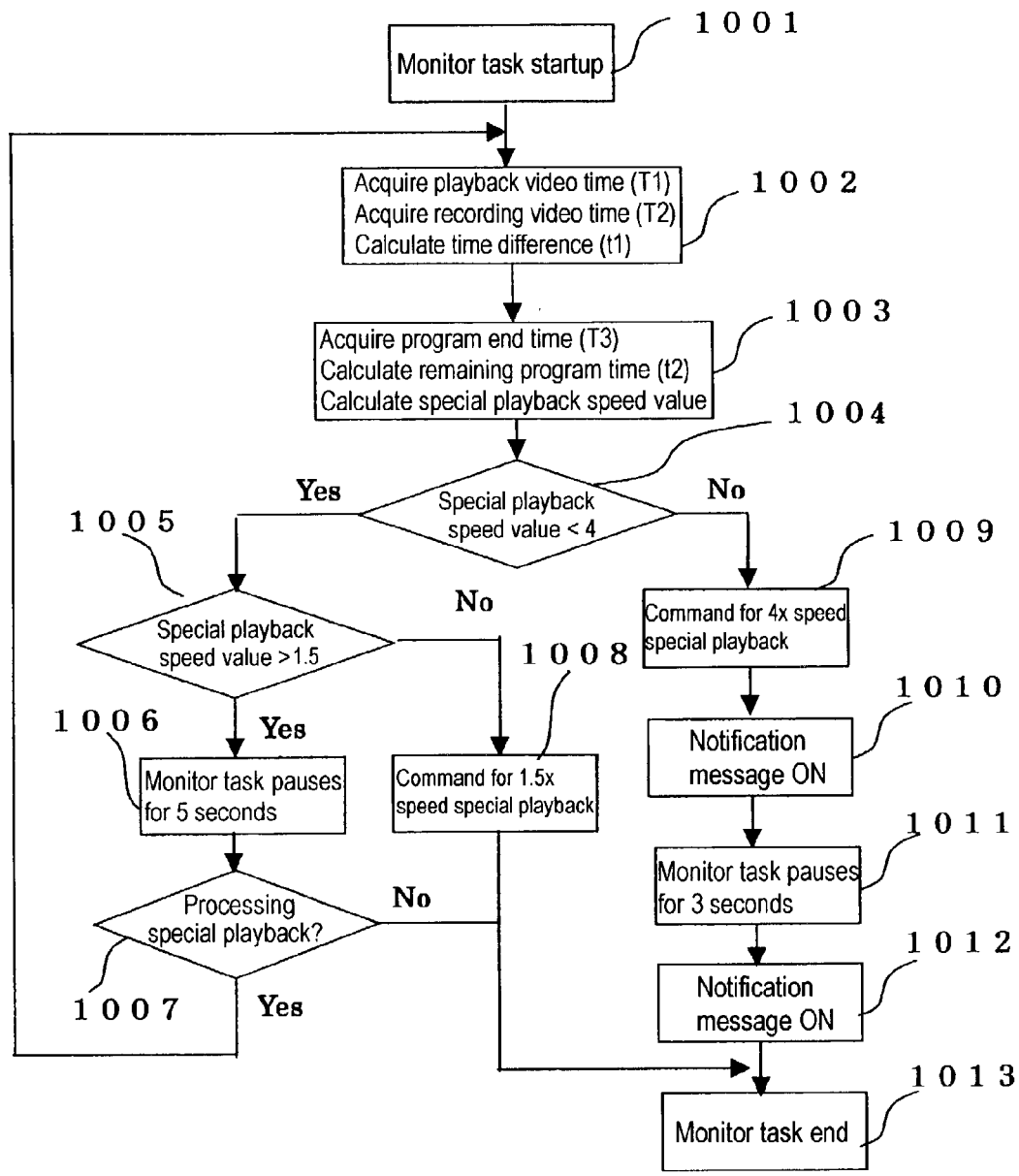
FIG. 10 is a flowchart for describing special playback speed decision steps in monitor task of a time-shift recording of a reproducing method of the third embodiment of the invention.
Figure 11:
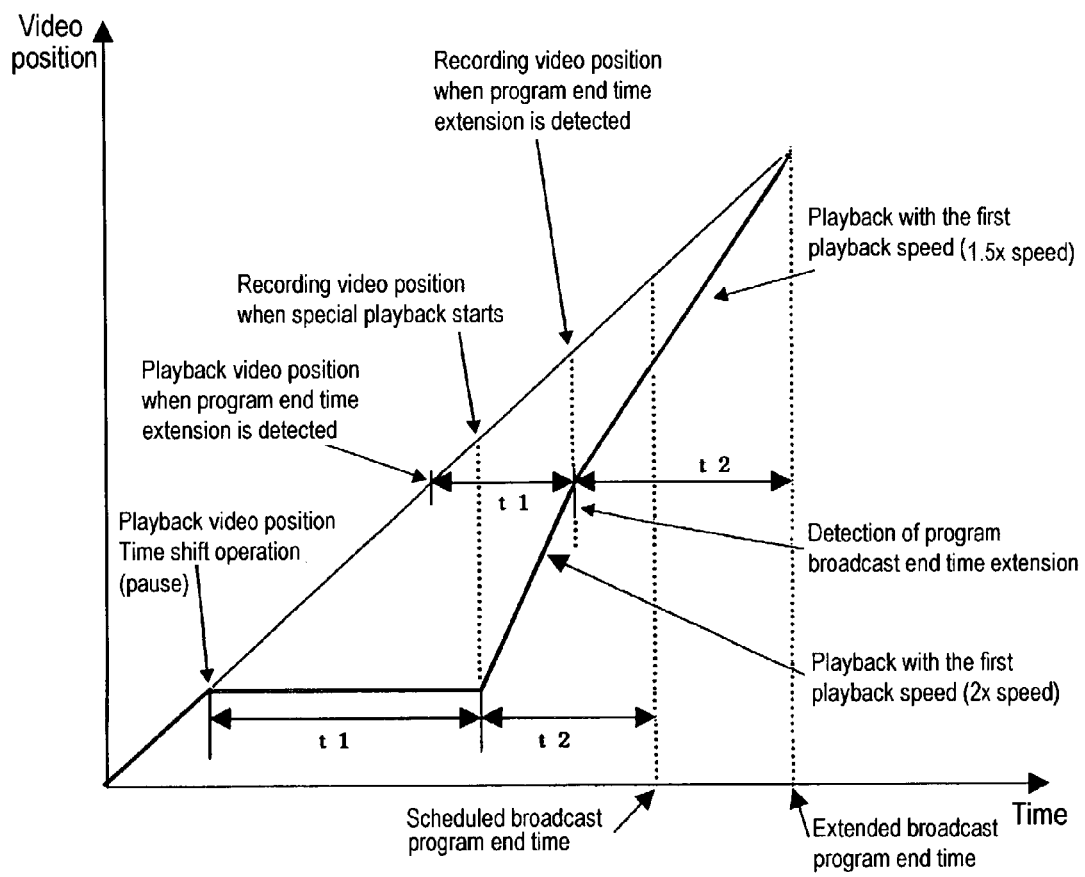
FIG. 11 is a diagram showing relation between video position and time in the third embodiment.

FIG. 11 is a diagram showing relations between video position and time when special playback process shown in FIGS. 9 and 10 is executed.

In the third embodiment described above, viewer can end playback of a program with grasping the program contents, automatically resolving time difference occurred by time-shift operation by the time the broadcast program ends without troublesome playback command operation.

In this embodiment, in process step 907 shown in FIG. 9, the second playback speed that enabling program contents to be understood only from video without audio is set to 4× speed, but other setting may be applicable.

In the process step 910 shown in FIG. 9, upper limit of the first playback speed enabling audio contents to be understood is set to 2× speed playback, but other setting may be applicable. Also, in the process step 1006 shown in FIG. 10, monitor period of the monitor task is set to for 5 seconds but the period may be changed.

The Fourth Embodiment

Structure and action of the recording and reproducing apparatus of the fourth embodiment of the present invention is described, referring to FIGS. 1, 9, 12 and 13.

The fourth embodiment of the recording reproducing apparatus is similar to that of the first embodiment. However, recording means 103 in this embodiment has a function for detecting commercial portion during audio and video recording of the broadcast program, and commercial start and end time information for each commercial will be stored in other area from audio and video data storing area in memory means 101.

As a method for detecting commercial portion, Japanese Patent publication No. 2000-115713 is known.

Figure 12:
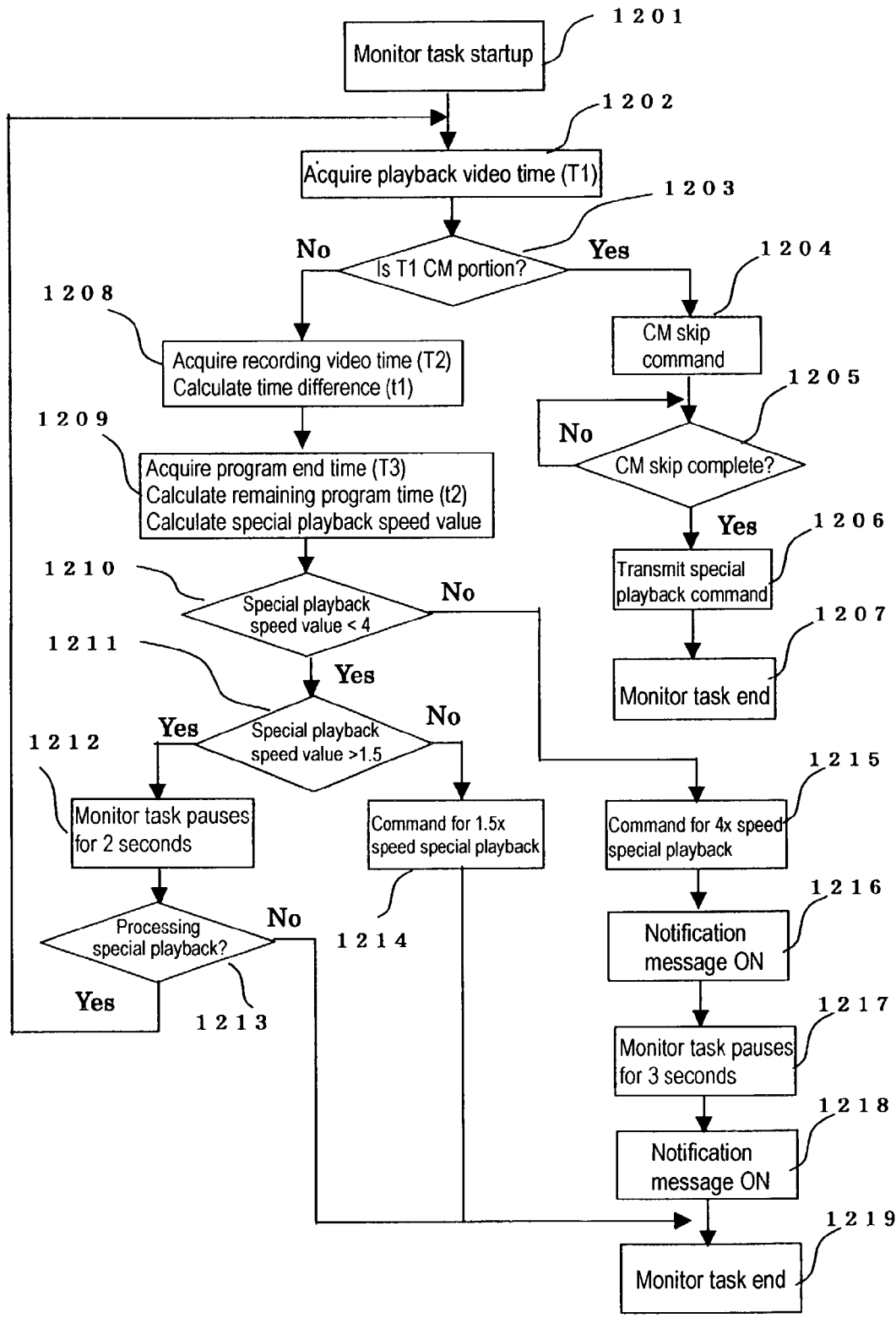
FIG. 12 is a flowchart for describing special playback speed decision steps in monitor task of a time-shift recording and reproducing method in the forth embodiment of the invention.

In action of the special playback speed decision means 109, action of monitor task is described referring to flowchart of FIG. 12 because only action of monitor task is different from that of described in the third embodiment.

This monitor task, which is included in the decision means 109, monitors timing for automatically changing the first playback speed to the second playback speed in case when it is impossible to end the program playback by the time broadcast program ends if the first playback speed decided at process step 910 is kept until the program end time. The monitor task also detects a commercial portion to skip the CM portion to keep the first special playback speed as long as possible, and if possible changes the first special speed playback to the lower one. In this embodiment, the first playback speed is a speed enabling audio of playback scene to be understood, and the second playback speed is a speed enabling playback scene to be understood only from video without audio. The first playback speed is set to 2× speed in the fourth embodiment.

Hereinafter the performance of the monitor task is described. The monitor task starts (step 1201) first. Next, time information T1 of the playback video that is being reproduced by the reproducing mechanism 104 is acquired from the reproducing means 105 (step 1202). Then playback video is determined whether it is a commercial portion or not by comparing start and end time information of commercial portion, which was acquired from the recording means 103 while recording, with time information T1 of the playback video (step 1203).

When it is judged that playback scene is a commercial portion; skip command for skipping the commercial portion to the commercial end point is commanded to the reproducing means 105 (step 1204). Then, the decision means 109 waits for commercial skip completion message from the reproducing means 105 (step 1205). When commercial skip ends, special playback command is transmitted to the special playback speed decision task shown in FIG. 9 for continuing playback action from the skip end point (step 1206), and then monitor task ends (step 1207).

When it is judged that playback scene is not a commercial portion; time information T2 of video that is being recorded by the recording mechanism 102 is acquired from the recording means 103, then time difference t1 is calculated by T2−T1 (step 1208). Next, program broadcast end time T3 is acquired from EPG information and remaining broadcast program end time t2 is calculated by T3−T2. Then, special playback speed value is calculated by (t1+t2)/t2 (step 1209). In the fourth embodiment, the second playback speed that enabling playback content only from video without audio to be understood is set to 4× speed. Then this calculated special playback speed is determined whether it is less than 4 (step 1210).

When special playback speed value is less than 4; special playback speed value is determined whether it is 1.5 or less (step 1211).

When the special playback speed value is 1.5 or less; even if special playback speed is changed from 2× speed to 1.5× speed, time difference can be eliminated by the broadcast program end because time difference (t1) in process step 1208 is shortened and special playback speed value calculated by (t1+t2)/t2 becomes smaller according to commercial skip execution.

In this case, the reproducing means 105 is commanded to perform 1.5× speed (step 1214), and the monitor task ends (step 1219).

When special playback speed value is more than 1.5; monitor task pauses for 2 seconds (step 1212), and determines whether special playback is still in process (step 1213) after 2 seconds. If special playback is still in process, the monitor task returns to process step 1202. If special playback process is already ended based on the command sent from the operation input means 107, the monitor task ends (step 1219).

In some cases that the playback speed should be raised normally to the second special playback speed of 4× speed in the process step 1210, the first playback speed of 2× speed can be applicable by performing commercial skip. Namely, skipping commercial increases situations that 2× speed playback of the first playback speed can be kept.

When special playback speed value is 4 or more; the reproducing means 105 is commanded to execute playback with the second playback speed of 4× speed (1215). In this fourth embodiment, message for notifying a viewer to inform that special playback speed is changed from 2× speed to 4× speed is displayed on video output screen (1216).

Then, monitor task pauses for 3 seconds (1217), and the message displayed in the process step 1216 disappears (1218) and the monitor task ends (1219).

Figure 13:
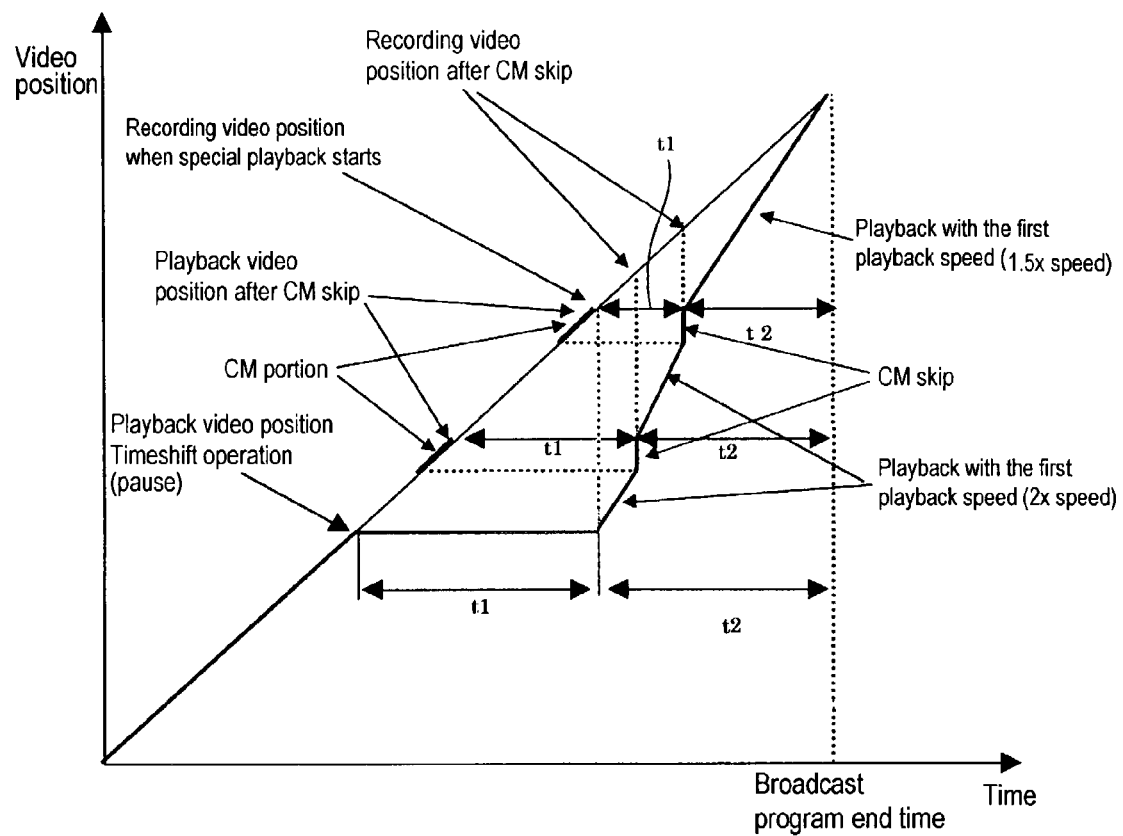
FIG. 13 is a diagram showing relations between video position and time in the fourth embodiment of the present invention.

FIG. 13 is a diagram showing relations between position of record/playback video and time when special playback process shown in FIGS. 9 and 12 is performed.

In the fourth embodiment described above, viewer can finish program viewing eliminating time difference caused by time-shift operation automatically by the time the broadcast program end without troublesome playback command operation and with grasping the program contents.

In this embodiment, the monitor period of monitor task is set to 2 second in the process step 1212 shown in FIG. 12, but the monitor period can be changed.

The Fifth Embodiment

Structure and action of the fifth embodiment of the present invention is described referring to FIGS. 1, 9, 14 and 15.

Recording and reproducing apparatus of this embodiment is similar to that of in the first embodiment. However, in the fifth embodiment, reproducing means 105 constantly monitors and memorizes the last position of the playback video that was viewed at normal playback speed with a condition that there was no time difference between the time position of video signal which is being reproduced by the reproducing mechanism 104 and the time position of video signal which is being recorded by the recording mechanism 102.

In the action of special playback speed decision means 109, only action of monitor task is different from that in the third embodiment. Therefore, action of monitor task in the fifth embodiment is described referring to flowchart in FIGS. 9 and 14.

This monitor task is included in the special playback speed decision means 109, and is monitoring timing to change the first playback speed to the second playback speed automatically. In other words, when playback with the first playback speed (2× speed in the fifth embodiment), which is decided in the step 910 in the fifth embodiment, is applied until the broadcast program end, the program playback does not end by the broadcast program end. Therefore, monitor task monitors timing to automatically change the first special playback speed to the second one. The operation input means 107 sends a command to the total control means 108 for skipping playback to the last viewed video position viewed with normal playback speed in the condition that there was no time difference (hereinafter called viewed video skip command). When the total control means 108 receives the command, it gives the skip command to the decision means 109. By skipping the video position to the last viewed video position when special speed playback video position is in the past than the last viewed position, the decision means 109 keeps the first special playback speed as long as possible or changes to the lower speed if possible.

Monitor task starts up at first (step 1401), and determines whether viewed video skip command is transmitted from the total control means 108 (step 1402).

Figure 15:
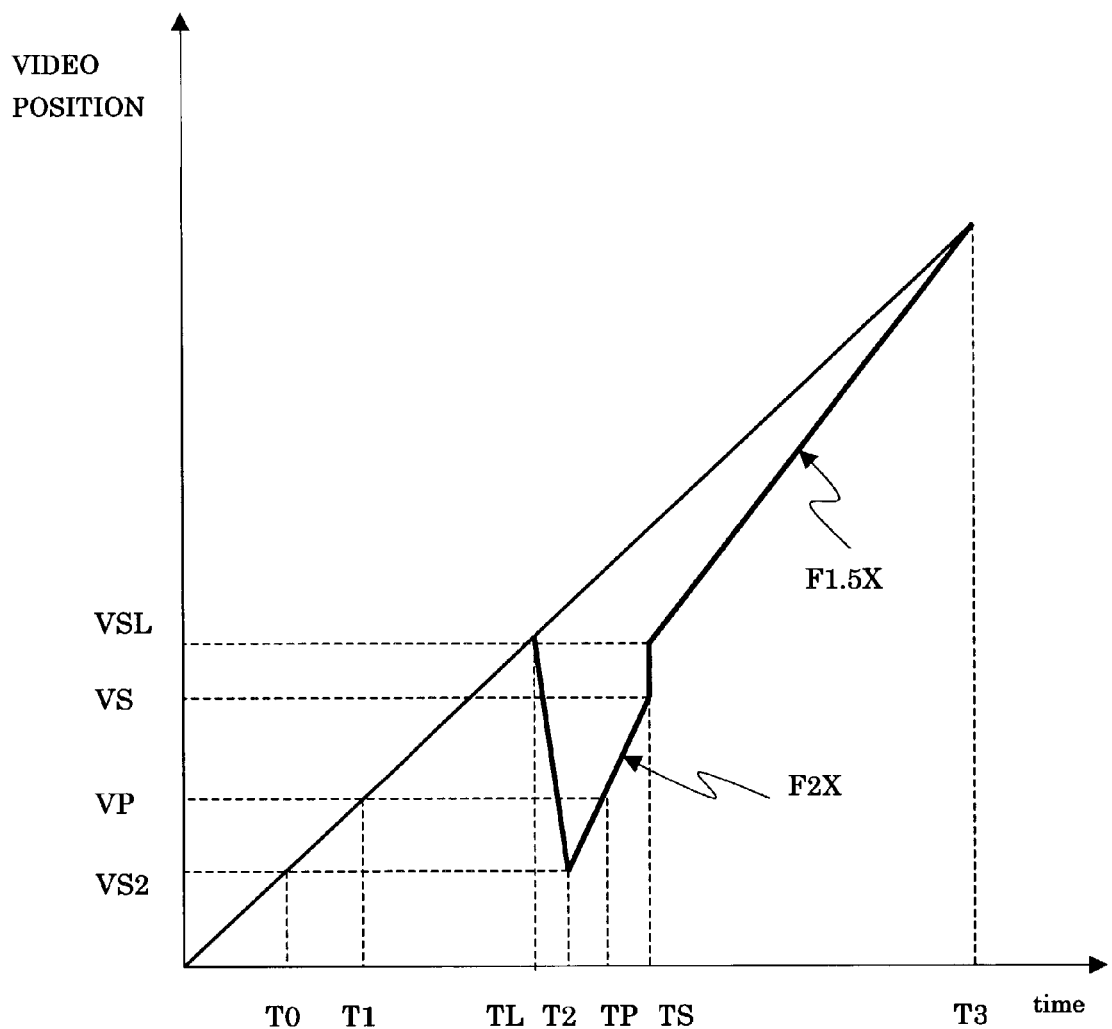
FIG. 15 is a diagram showing relation between video position and time in fifth embodiment.

When viewed video skip command is received; time information T1 of playback video position that is being reproduced by reproducing mechanism 104 is acquired from reproducing means 105 (step 1403). Time information T1 of the special playback video position is compared with time information TL of the last viewed video position (VSL) at normal playback speed in the condition that there is no time information (step 1404). If the former time (T1) is more past than the time TL, skip command is given to the reproducing means 105 for skipping playback video to the last viewed video position (step 1405). Then, the decision means 109 waits for video skip completion message sent from the reproducing means 105 (step 1406). When video skip is over, the decision means 109 transmits special playback command to the special playback speed decision task in FIG. 9 to restart playback with special playback speed from the skip end position TS (step 1407), and then the monitor task ends (step 1408). In FIG. 15, start and end of the skip TS is the same time in order to simplify the description.

In the above process step 1404, if video position in special playback and the last viewed video position is near, effect of this fifth embodiment is reduced. Therefore, it is desirable to execute the above step 1405 when the time difference between the video position in special playback and last viewed video position is more than about one minute.

When viewed video skip command is not received; time information T1 of the playback video that is being reproduced by reproducing mechanism 104 is acquired from the reproducing means 105 and time information T2 of recording video which is being recorded by the recording mechanism 102 is acquired from recording means 103. Then, time difference t1 is calculated by T2−T1 (step 1409). After that, program broadcast end time T3 is acquired from EPG information, and remaining broadcast program time t2 is calculated by T3−T2, and next special playback speed value is calculated by (t1+t2)/t2 (step 1410). In the fifth embodiment, the second playback speed that enabling contents of playback scene to be understood only from video without audio is set to 4× speed, as the third embodiment. The calculated special playback speed value is determined whether it is 4 or less (step 1411).

When the special playback speed is less than 4; monitor task determines whether the special playback speed value is 1.5 or less (step 1412).

When the special playback speed value is 1.5 or less; in this case, according to skip to viewed video portion, time difference disappears by the program ends even if the special playback speed is reduced from 2× speed to 1.5× speed because time difference t1 in the above process step 1409 becomes smaller. As a result, special playback speed value (t1+t2)/t2 becomes small.

In this case, the speed decision means 109 commands the reproducing means 105 to perform 1.5× speed playback (step 1415), then monitor task ends (step 1420).

When the special playback speed value is more than 1.5; monitor task pauses for one second (step 1413), and then determines whether the special playback process is still in continued after one second (step 1414). When special playback process is still in continue, the process returns to the process 1402. If the special playback process is already ended by a command from the operation input means 107, monitor task ends (step 1420).

Even in such case that special playback speed should be increased to the second playback speed by process step 1411 if skip action to the last viewed portion is not executed, it becomes possible to keep the special playback of the first playback speed by skipping to the last viewed portion.

When the special playback speed is 4 or more; monitor task commands the reproducing means 105 to perform 4× speed playback of the second playback speed (step 1416). In the fifth embodiment, message to notify the viewer that special playback speed is automatically increased from 2× speed to 4× speed will be displayed in the video output screen (step 1417).

After that the monitor task pauses for 3 second (1418), then message displayed in the process step 1419 disappears (step 1419) and the monitor task ends (step 1420).

Figure 14:
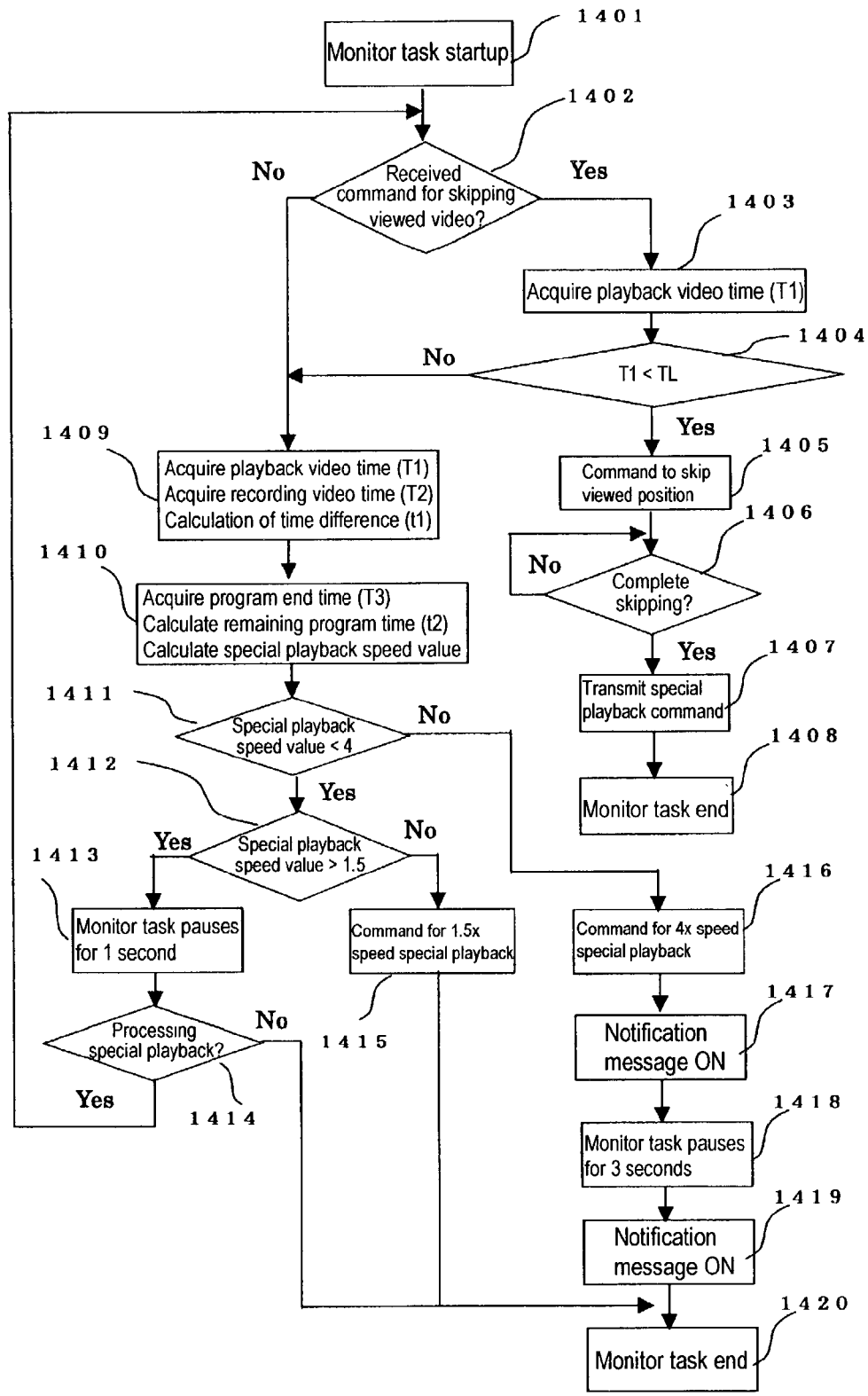
FIG. 14 is a flowchart for describing special playback speed decision in monitor task of a time-shift recording and reproducing method of the fifth embodiment of the invention.

FIG. 15 shows a diagram of relations between position of record/playback video and time when special playback process shown in FIGS. 9 and 14 is performed.

In special playback action shown in FIG. 15, video position returns from VSL to VS2 in time from TL to T2 (this return action is called reverse operation), then playback with the second special playback speed F2× starts at time T2, then at time TS video position skips to the last viewed video position VSL. From video position VSL playback with the first playback speed F 1.5× is performed. In other words, while watching a program in real-time, viewer makes reverse operation. Then playback with the second special playback speed F2× starts from VS2 position. When viewed video skip command is transmitted at TS while the playback is proceeding, the reproducing mechanism 104 acquires time information T1 corresponding to VS position. When the acquired time information T1 is in the past from TL, playback video skips to the last viewed video position VSL.

Of course, above playback speed F2× after the reverse operation may be normal speed playback. Then, video position may skip at TS to the last viewed position and playback with special playback speed starts corresponding to the time difference.

Regarding playback action until video position VSL, real-time playback action with normal playback speed is described. However, if reserve search operation is performed in time shift operation with special playback speed, the same effect is obtained.

According to the above fifth embodiment, when viewer wants to watch already viewed scene again, viewer can playback the desired scene with a special playback speed determined by the special playback speed decision means 109 after reverse search operation so on, and then playback video position returns to the last video viewed position with normal playback speed in an instant. After that, playback with a special playback speed will be continued for automatically eliminating the time difference by the broadcast program end time. Therefore, viewer can end playback of a program with grasping the program contents, automatically resolving time difference occurred by time-shift operation by the time the broadcast program ends without troublesome playback command operation.

In this embodiment, monitor task pause time is set to one second in the process step 1413 shown in FIG. 14. However, from a viewpoint of adjusting reception response of viewed video skip command received by process step 1402, other setting can be applicable.

The Sixth Embodiment

Figure 16:
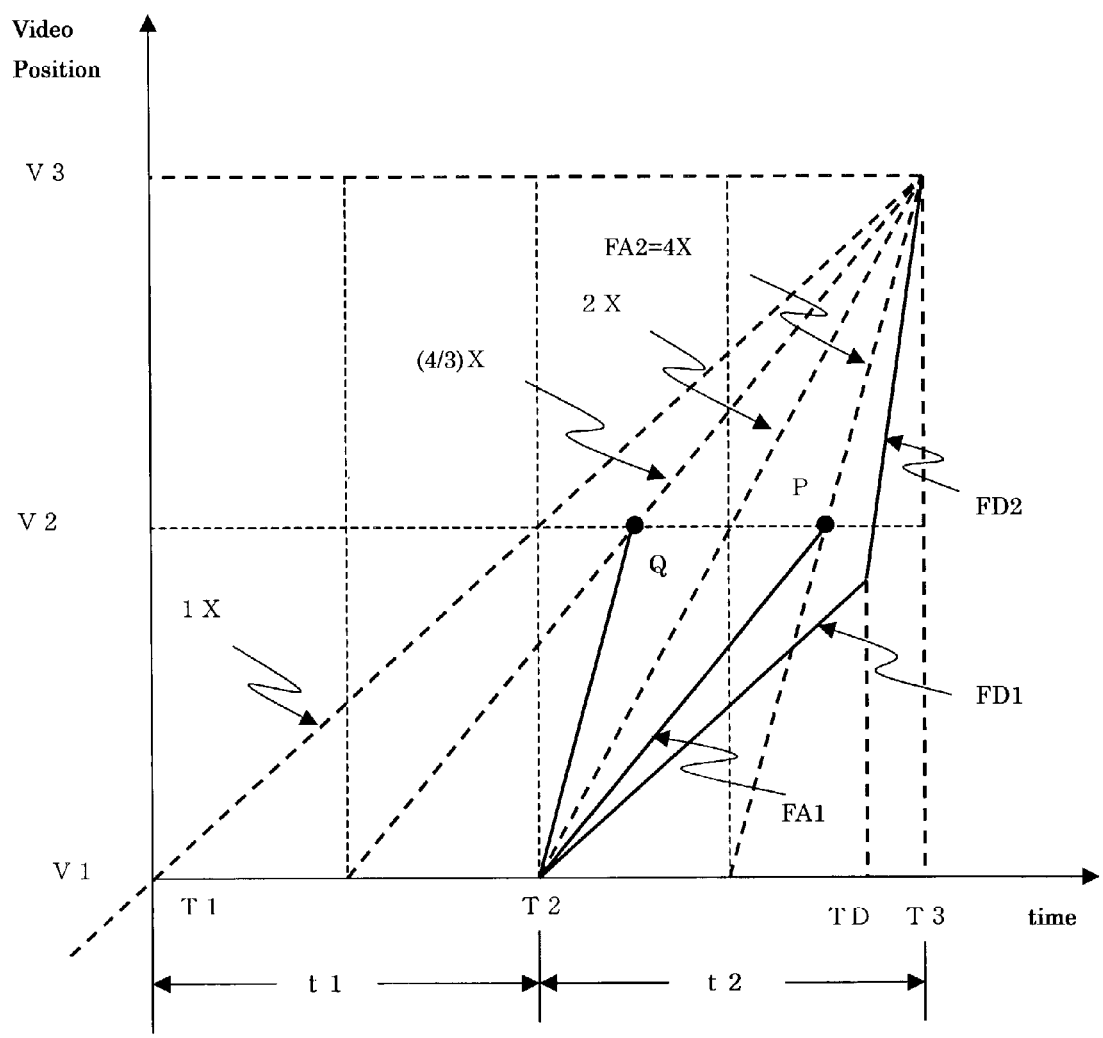
FIG. 16 is a diagram showing relation between video position and time in sixth embodiment.

Next, action of a recording and reproducing apparatus of the sixth embodiment of the present invention is explained referring to FIG. 16.

The difference between the sixth embodiment and other embodiments is, in using 2 predetermined special playback speeds sequentially, that one of the 2 predetermined special playback speeds is input by operation input means 107. When time difference t1 and remaining time t2, which is time to left to a desired program end time T3 from a desired start time of a program T2, are calculated and one of the 2 predetermined special playback speeds is set, switching timing to the other predetermined special playback speed is automatically calculated. In other words, when start point (T2, V1) and end point (T3, V3) are decided, and 2 straight lines which are respectively inclined are drawn, the 2 lines crosses. This crossing points P and Q are selected corresponding to which one of the 2 predetermined special playback speed is set. These cross points are detected by the monitor task previously described in actual procedure, but they may be calculated.

Namely, special playback speed FA1 (=(4/3)×) is used for the period from start point (T2, V1) to P point, and special playback speed FA2 (=4×) is used from P point to the end point (T3, V3). Or special playback FA1 (=4×) is used for the period from start point (T2, V1) to Q point and special playback speed FA2 is used from Q point to end point.

Also, desired time period (for example, time period from T2 to TD) and the first special playback speed FD1 may be input at a desired start point by operation input means 107. After desired period passes, special playback speed FD2 will be calculated based remaining time from the point by the special playback speed decision means 109. By controlling special playback speed in the above-mentioned way, viewer can perform playback with a desired speed and desired period, grasping program contents.

In the above embodiments, playback speed control means of the present invention has special playback speed decision means 109. However, the means is not limited to the above, and any means for controlling playback speed based on program information relating the program broadcasting end time may be applicable so that the playback program ends by the broadcast program ends if predetermined condition is satisfied.

In short, program recording and reproducing apparatus of the present invention is a apparatus for recording and reproducing a broadcast program which having time-shift reproduction, and it has a playback speed control means for controlling playback speed based on the program information relating program broadcast end time so that the playback ends by the time the broadcast ends if predetermined condition is satisfied. In addition, the desired time which is not limited to program finish time is set, and special playback speed can be switched at the desired time.

In addition, playback speed may be controlled to perform the following. For example, when firstly "pause" command is directed and then "time-shift playback" command is directed to release "pause" and to perform time shift playback, time shift playback is performed to reproduce video from the "pause" command to the end of the program during time from "time-shift playback" command is made to the end of the program. In the first embodiment, when command to pause playback is input, video from the pause command is made to the program end is reproduced with special playback speed. However, regarding playback video during pause, it is not limited. For instance, playback may be continued until the time shift playback starts.

In addition, when once reverse search is operated, then time shift playback operation is performed, video from when reverse search command is input to the end of the program may be reproduced with special playback speed during time shift playback is commanded to the end of the broadcast program. In the fifth embodiment, reverse search command is input, and then video from playback after the reverse search command is made until the program end is to be reproduced with special playback speed. However, regarding video position that reverse search should be done, it is not limited. For instance, viewer who is viewing video when reverse search is executed may decide the video position manually or it may be automatically decided by presetting a certain time and so on.

Also, a case that predetermined condition is satisfied may include a case that it is possible to control playback speed within predetermined limit speed so that program being played back ends by the broadcast program end time. In addition, if predetermined condition is not satisfied, playback speed may be controlled within the predetermined limit speed. (In this case, playback program may not end by broadcast program end time.) The predetermined limit speed may be decided considering (1) playback speed enabling audio contents of playback scene to be understood to viewer, and (2) playback speed that playback scene only from video without audio to be understood to viewer.

Program information is electric program information periodically updated and control may be done considering result of electronic program information update (such as broadcast program end time extension shown in FIG. 11) and so on.

(0130)

Broadcast programs have commercial portion, which is irrelevant to the contents of the program. Commercial portion detection means for detecting commercial portion may be provided in the apparatus and control may be done considering result of commercial portion detection such as CM skip shown in FIG. 13.

Viewed portion detection means for detecting a portion that reproduced at least one time may be provided in the apparatus and control may be done considering result of the viewed portion detection such that skipping to the last viewed portion shown in FIG. 15 for example.

This invention is a program for executing functions of a whole or a part of a means (or a device, an element, a circuitry or a part) of a program recording and reproducing apparatus of the present invention by computer, and for working together with computer. The computer may include firmware, OS and computer peripheral systems, as well as pure hardware such as CPU.

Also this invention is a program for executing movements of a whole or a part of steps (or a process, a movement, or an operation) of above-mentioned program recording and reproducing method by computer, and for working together with computer.

A part of means (or apparatus, element, circuitry or part) and/or a step (or procedure, action or influence) of the present invention include plurality of the means or steps, and some of the means and the steps.

A part of device (or element, circuitry or part) of the present invention means some of the devices within plurality of devices, or a part of means (or element, circuitry or part) of a device, or a part of function within a means.

The present invention includes a computer accessible recording medium that program of the present invention is recorded. In one use form, the program of the present invention may be recorded on a computer accessible recording medium to work together with computer(s). In another use form of the program, the program may be transmitted through transmission medium and read by computer(s) to work together with computer(s). As a recording medium, ROM etc. is applicable. As transmission medium, transmission medium such as Internet, light, electric wave, sound wave, and so on are included.

Structure of the present invention can be actualized as software and as hardware.

The present invention is a medium carrying a program to execute by computer(s) the whole or a part of the function of the whole or a part of means of a program recording and reproducing device, and the program that is readable and read by computer(s) executes the mentioned function(s) by working together with computers.

Also the present invention is a medium carrying a program to execute the whole or a part of action of the whole or a part of the steps of a program recording and reproducing method that mentioned above by computer(s), and the program that is readable and read by computer(s) executes the mentioned function(s) by working together with computers.

As described, the present invention aims to perform playback with special playback speeds for eliminating time difference automatically by the time broadcast program ends when time difference exists. The special playback speeds includes the first special playback speed enabling the playback scene with audio contents to be understood, and the second special playback speed enabling the playback scene only from video without audio to be understood. Furthermore, the present invention also aims that viewer can finish viewing the playback by the broadcast program end time with understanding program contents using two playback speeds.

Figure 17:
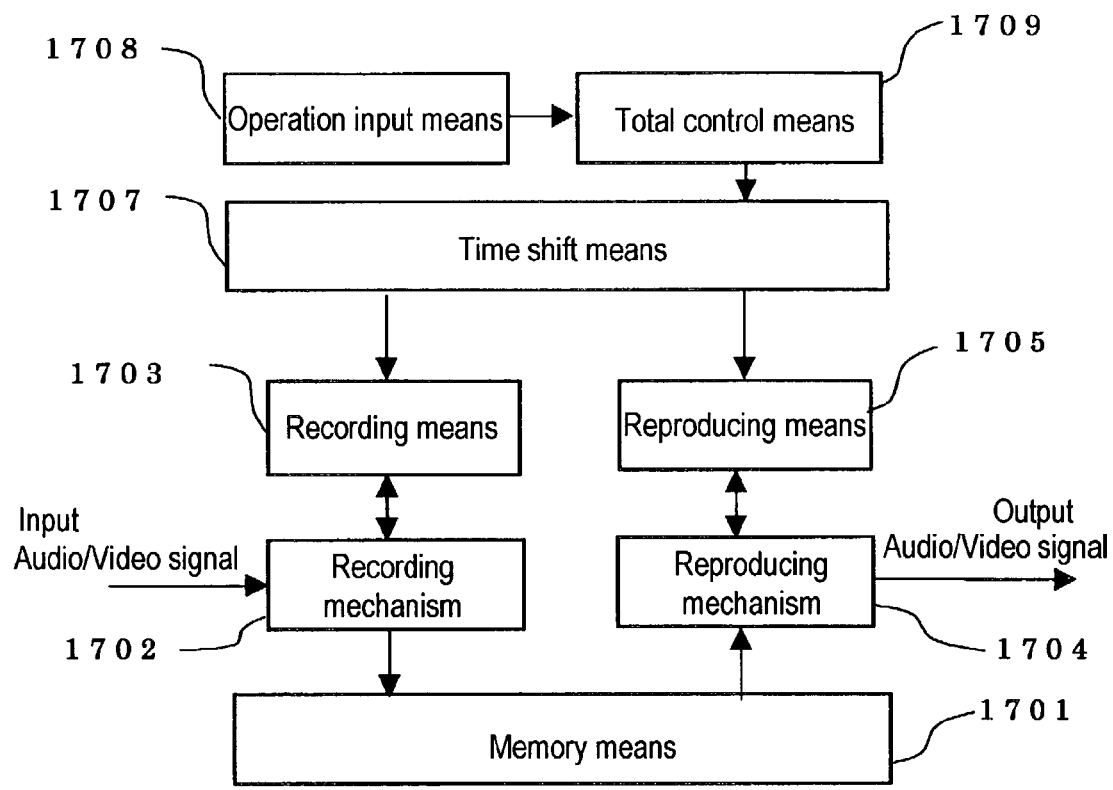
FIG. 17 is a block diagram illustrating system structure of a recording and reproducing apparatus having conventional time-shifting function.
Figure 18:
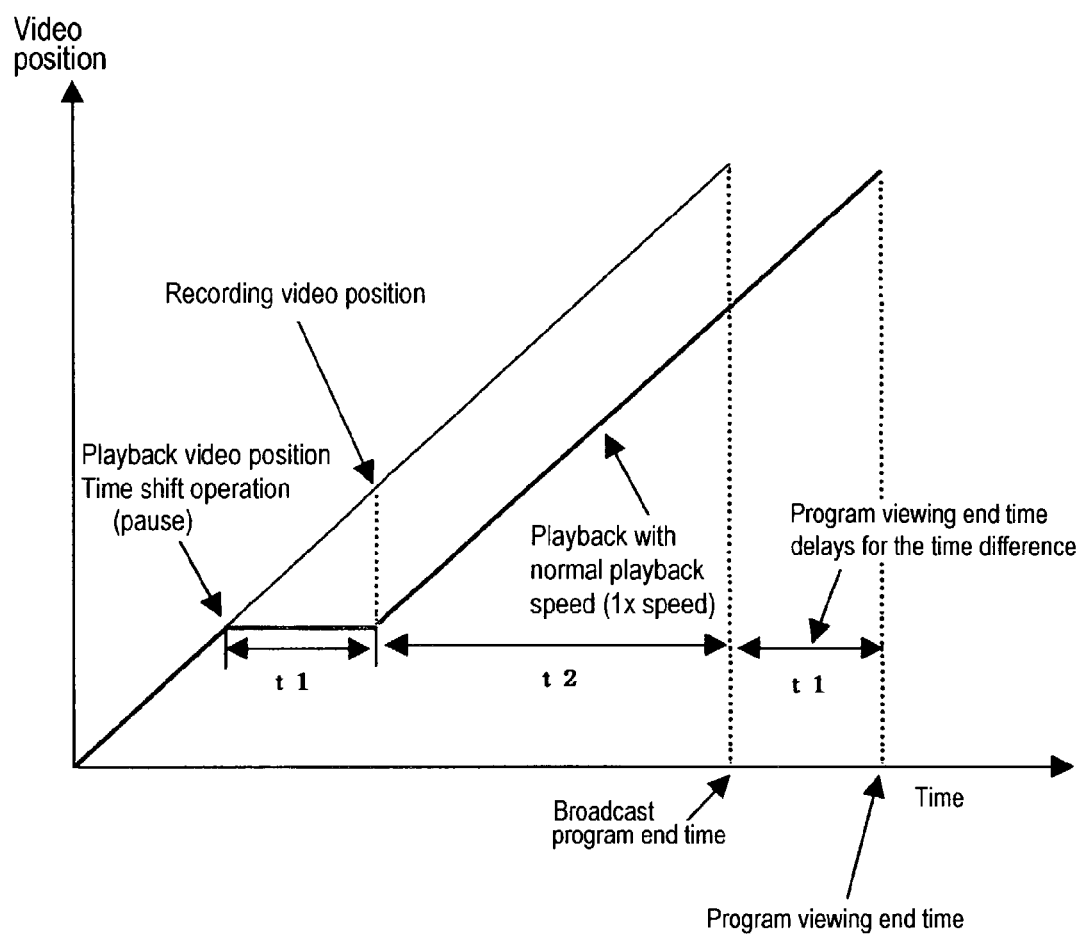
FIG. 18 is a diagram showing relation between video position and time in the prior art.

Concretely, this invention provides special playback speed decision means for determining special playback speed enabling program contents to be understood and to finish playback by the end of program in a recording and reproducing apparatus which has conventional time shift function shown in FIG. 17. The system construction is shown in FIG. 1.

In special playback speed decision means shown in FIG. 1, special playback speed value is calculated from time difference (t1) and remaining broadcast program time (t2) which is left until program end time by (t1+t2)/t2. Based on the calculated value, special playback speed is determined to the first predetermined playback speed that reproducing mechanism shown in FIG. 1 can correspond, allowing viewer can end viewing the playback by the broadcast program end time with grasping program contents. Determination to the first playback speed means to keep the playback with audio as long as possible for viewer to understand the program contents.

For example, in recording and reproducing apparatus for recording audio and video signals of broadcast program having randomly accessible recording medium, the apparatus has a function that a playback scene can catch up with the broadcasting scene when past scene of the program being recorded is played back. Also the apparatus has special playback speed decision means to control special playback speed of first playback speed that enabling audio of the playback scene to be understood and second playback speed that enabling only video of the scene. With the special playback speed decision means, viewer can finish playback program viewing by the recording program end time with understanding program contents.

For example, this invention enables that based on time information concerning recording scene on the record medium, end time information of received broadcast program, and time information of playback scene reproduced from the recording medium, in case when special playback speed value calculated by the special playback speed decision means is faster than the first playback speed, playback with the first playback speed is kept as long as possible until the time decision that it is impossible to end playback by the recording program end time unless playback speed is changed to the second playback speed is made, and viewer can finish playback program viewing by the recording program end with grasping program contents.

For example, this invention enables that based on time information concerning recording scene on the record medium, end time information of received broadcast program, and time information of playback scene reproduced from the recording medium, in case when special playback speed value calculated by the special playback speed decision means is faster than the first playback speed, playback with the second playback speed is kept until decision that it is possible to finish playback program by the recording program end even if playback speed is changed to the first playback speed is made, and then the playback speed is changed to the first playback speed. As a result, viewer can end playback by the recording of the program end with grasping program contents.

As described above, when timing for switching the first special playback speed to the second special playback speed (step 404 or 407), or for switching the second special playback speed to the first special playback speed (step 704 or 707) is detected, the special playback speed will be switched respectively. These switching timing is decided considering special playback speed to be applied and remaining broadcast program time so that time shifting playback ends almost simultaneously with the broadcast program end time. Of course, special playback speed switching can be done as soon as the switching timing is detected. Also playback with the special playback speed catches up with the current recording broadcast program, playback speed may change to normal playback speed to control playback performance.

For example, this invention enables that said special playback speed decision means has a means to detect extension of broadcast program end time, and when it is detected by the special playback speed decision means, viewer can end program viewing understanding program contents by controlling playback speed of said special playback speed of the first playback speed and the second playback speed.

For example, this invention enables that said special playback speed decision means has a means to detect commercial portion and when it detects commercial portion, commercial portion is automatically skipped. After commercial skip, by controlling said special playback speed by a playback speed of the first and second playback speed, viewer can end program viewing understanding program contents.

For example, this invention enables that said special playback speed decision means has a means to skip to the last viewed position with normal playback speed. After playback skips to the last viewed position, by controlling said special playback speed by a playback speed of the first and second playback speed, viewer can end program viewing understanding program contents.

Therefore, the present invention for example, enables that in recording and reproducing apparatus having time shift function has a means for deciding special playback speed that time difference occurred by time shift operation is resolved automatically by the end of the broadcast program. The special playback speed decided by the special playback speed decision means is a playback speed that enabling audio contents of playback scene to be understood or a playback speed that enabling contents of playback scene to be understood from only video without audio. So, viewer can end program viewing understanding program contents.

As described above, the present invention enables to understand program contents easier even when time shift playback is performed and to finish viewing playback program by the broadcast program end time.

What is claimed is:

1. A method of time shifting a program which is recorded, said method comprising the steps of:
    (a) calculating a first difference between a predetermined playback start time of said program and a predetermined recorded time of said program;
    (b) calculating a second difference between said predetermined playback start time of said program and a predetermined end time of said program;
    (c) determining a playback speed of said recorded program based on steps (a) and (b);
    (d) comparing the determined playback speed with a maximum speed, the maximum speed corresponding to a second predetermined speed at which users understand video contents without understanding audio content;
    (e) if the determined playback speed is equal to or less than the maximum speed, sequentially causing playback of said recorded program at a plurality of speeds based on said playback speed determined in step (c);
    wherein the plurality of speeds include (1) a first predetermined speed such that users understand the audio and video content and (2) the second predetermined speed such that users understand the video content without understanding the audio content.

2. A method of time shifting a program according to claim 1 wherein the maximum speed is a speed four times faster than a normal playback speed and said desired recorded time of said program is a start time corresponding to a video position which starts said recorded program.

3. A method of time shifting a program according to claim 1, wherein said plurality of speeds include:
    (1) a first special playback speed which is a speed (a) faster than a normal playback speed and slower than a speed twice as fast as the normal speed or (b) equal to the speed twice as fast as the normal speed, and
    (2) a second special playback speed which is a speed (a) faster than the speed twice as fast as the normal speed and slower than a speed four times faster than the normal playback speed, or (b) equal to the speed four times faster than the normal playback speed.

4. A method of time shifting a program according to claim 1, further comprising a step of setting a playback period from said predetermined start time at the second determined playback speed.

5. A method of time shifting a program according to claim 1, wherein when one of 2 predetermined speeds is specified, a switch timing to the other of said 2 predetermined speeds is detected.

6. A method of time shifting a program according to claim 1, further comprising the step of skipping from a playback video position currently being reproduced to a past video position, wherein said playback speed is controlled based on time difference after skipping operation.

7. A method of time shifting a program according to claim 1, further comprising the steps of:
    performing a first skip operation for skipping from a current playback position to a past video position; and
    performing a second skip operation for skipping to the start video position of said first skip operation during playback after the first skip operation;
    wherein said playback speed is controlled based on time difference after the second skip operation.

8. A method of time shifting a program according to claim 1, further comprising the steps of:
    identifying a commercial portion of said program; and
    skipping said commercial portion;
    wherein said playback speed of said recorded program is determined with said commercial portion removed from said program.

9. Apparatus for time shifting a program which is recorded, comprising:
    a calculator for
        (a) performing a first calculation based on a first difference between a predetermined playback start time of said program and a predetermined recorded time of said program;

(b) a second calculation based on a second difference between said predetermined playback start time of said program and a predetermined end time of said program;

(c) determining a playback speed of said recorded program based on said first calculation and said second calculation; and (d) comparing the determined playback speed with a maximum speed, the maximum speed corresponding to a second predetermined speed at which users understand video content without understanding audio content; and a controller for sequentially causing playback of said recorded program at a plurality of speeds based on said playback speed determined by said calculator if the determined playback speed is equal to or less than the maximum speed;

wherein the plurality of speeds include (1) a first predetermined speed such that users understand the audio and video content and (2) a second predetermined speed such that users understand the video content without understanding the audio content.

10. Apparatus according to claim 9, wherein said predetermined recorded time of said program is a start time corresponding to a video position which starts said recorded program.

11. Apparatus according to claim 9, wherein said plurality of speeds include:
(1) a first special playback speed which is a speed (a) faster than a normal playback speed and slower than a speed twice as fast as the normal speed, or equal to said speed twice as fast as the normal speed, and
(2) a second special playback speed which is a speed (a) faster than said speed twice as fast as the normal speed and slower than a speed four times faster than the normal playback speed, or (b) equal to said speed four times faster than the normal playback speed.

12. Apparatus according to claim 9, further comprising setting means for setting a desired playback period from said predetermined start time and at the determined playback speed.

13. Apparatus according to claim 9, wherein when one of 2 predetermined speeds is set, a timing for switching to the other predetermined speeds is detected.

14. Apparatus according to claim 9, wherein program information including program end time information is periodically updated electric program information and the playback speed is determined considering an update result of said electric program information.

15. A method of time shifting a program which is recorded, said method comprising the steps of:
(a) calculating a first difference between a predetermined playback start time of said program and a predetermined recorded time of said program;
(b) calculating a second difference between said predetermined playback start time of said program and a predetermined end time of said program;
(c) determining whether a playback speed of said recorded program based on steps (a) and (b) is (1) equal to or less than a speed four times faster than the normal playback speed or (2) greater than a speed four times faster than the normal playback speed; and if the playback speed is determined to be greater than a speed four times faster than the normal playback speed, causing said recorded program to playback at the speed of four times faster than the normal playback speed; and if the playback speed is determined to be equal to or less than a speed four times faster than the normal playback speed:
  further determining whether the playback speed of said recorded program is (1) equal to or less than a speed two times faster than the normal playback speed or (2) greater than the speed two times faster than the normal playback speed; and if the playback speed of said recorded program is further determined to be equal to or less than a speed two times faster than the normal playback speed:
    further determining whether the playback speed is (1) equal to or less than a speed 1.5 times faster than the normal playback speed or
    (2) greater than a speed 1.5 times faster than the normal playback speed; and
    causing said recorded program to playback at the speed 1.5 times faster than the normal playback speed if the playback speed is determined to be equal to or less than the speed 1.5 times faster than the normal playback speed, and
    causing said recorded program to playback at the speed two times faster than the normal playback speed if the playback speed is determined to be greater than the speed 1.5 times faster than the normal playback speed; and if the playback speed of said recorded program is further determined to be greater than a speed two times faster than the normal playback speed causing said recorded program to playback at the speed two times faster than the normal playback speed; and wherein a task monitor switches the playback speed to switch between the determined playback speeds.

16. A method of time shifting a program according to claim 15, the speed 1.5 times faster than the normal playback speed is faster than the normal playback speed and slower than the speed of two times faster than the normal playback speed.

17. A method of time shifting a program according to claim 15, wherein the speed two times faster than the normal playback speed is a predetermined speed such that users understand the audio and video contents.

18. A method of time shifting a program according to claim 15, wherein the speed four times faster than the normal playback speed is a predetermined speed such that users understand the video contents without understanding the audio contents.

* * * * *